(12) United States Patent
Kim et al.

(10) Patent No.: US 9,234,675 B2
(45) Date of Patent: Jan. 12, 2016

(54) HOT WATER SUPPLY APPARATUS ASSOCIATED WITH HEAT PUMP

(71) Applicant: LG ELECTRONICS INC., Seoul (KR)

(72) Inventors: Byungsoon Kim, Changwon-si (KR); Jahyung Koo, Changwon-si (KR); Kyongmin Kwon, Changwon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/334,880

(22) Filed: Jul. 18, 2014

(65) Prior Publication Data

US 2014/0326012 A1    Nov. 6, 2014

Related U.S. Application Data

(62) Division of application No. 13/077,090, filed on Mar. 31, 2011.

(30) Foreign Application Priority Data

May 28, 2010    (KR) .................. 10-2010-0050322

(51) Int. Cl.
*F25B 7/00*     (2006.01)
*F24H 9/00*     (2006.01)
*F24D 11/02*    (2006.01)
(Continued)

(52) U.S. Cl.
CPC .......... *F24H 9/0005* (2013.01); *F24D 11/0214* (2013.01); *F24D 17/02* (2013.01); *F24D 19/1072* (2013.01); *F25B 13/00* (2013.01); *F25B 25/005* (2013.01); *F25B 30/02* (2013.01); *F25B 2339/047* (2013.01); *Y02B 30/126* (2013.01)

(58) Field of Classification Search
CPC ...... F24H 9/0005; F25B 30/02; F25B 25/005; F25B 13/00; F25B 2339/047; F25B 7/00; F25B 9/00; F24D 17/02; F24D 11/0214; F24D 19/1072; Y02B 30/126
See application file for complete search history.

(56) References Cited

U.S. PATENT DOCUMENTS

| 5,706,665 A | 1/1998 | Gregory .................. 64/174 |
| 2007/0023534 A1 | 2/2007 | Liu |

(Continued)

FOREIGN PATENT DOCUMENTS

| CN | 1563821 | 1/2005 |
| CN | 2708155 | 7/2005 |

(Continued)

OTHER PUBLICATIONS

U.S. Office Action issued in U.S. Appl. No. 13/077,090 dated Mar. 26, 2015.

(Continued)

*Primary Examiner* — M. Alexandra Elve
*Assistant Examiner* — Larry Furdge
(74) *Attorney, Agent, or Firm* — KED & Associates LLP

(57) ABSTRACT

A hot water supply apparatus associated with a heat pump is provided. The hot water supply apparatus may employ a cascade heat pump including a two-stage cycle to perform a hot water supply operation. Refrigerants flowing through a heat side heat exchanger and a usage side heat exchanger may be heat-exchanged with water. Thus, the hot water supply operation may be continuously performed, without a defrosting operation, and hot water supply performance and heating performance may be improved.

9 Claims, 12 Drawing Sheets

(51) Int. Cl.
  *F24D 17/02* (2006.01)
  *F24D 19/10* (2006.01)
  *F25B 13/00* (2006.01)
  *F25B 25/00* (2006.01)
  *F25B 30/02* (2006.01)

(56) References Cited

U.S. PATENT DOCUMENTS

2007/0056302 A1 3/2007 Otake et al. ............... 62/243
2010/0051713 A1 3/2010 Back et al. ............... 237/2 B

FOREIGN PATENT DOCUMENTS

| CN | KR | 8/2005 |
| | 10-2005-0082439 | |
| GB | 2 237 625 | 5/1991 |
| JP | 07-127934 | 5/1995 |
| JP | 08-28913 | 2/1996 |
| JP | 2002-081769 A | 3/2002 |
| JP | 2005-147456 A | 6/2005 |
| JP | 2008-032333 A | 2/2008 |
| JP | 2008-051464 | 3/2008 |
| JP | 2008-298407 | 12/2008 |
| KR | 10-0796452 | 1/2008 |
| KR | 10-2008-0097511 | 11/2008 |
| KR | 10-2009-0121740 | 11/2009 |

OTHER PUBLICATIONS

Final Office Action dated Nov. 6, 2014, issued in U.S. Appl. No. 13/077,090.
International Search Report issued in PCT Application No. PCT/KR2010/006616 dated Jun. 29, 2011.
Chinese Office Action issued in CN Application No. 201110062959.4 dated Feb. 21, 2013.
European Search Report issued in EP Application No. 11158502.2 dated Feb. 3, 2014.
U.S. Office Action issued in U.S. Appl. No. 13/077,090 dated May 9, 2014.
U.S. Appl. No. 14/334,943 dated Sep. 14, 2015.
U.S. Appl. No. 13/077,090 dated Sep. 24, 2015.

HOT WATER SUPPLY APPARATUS ASSOCIATED WITH HEAT PUMP

CROSS-REFERENCE TO RELATED APPLICATION(S)

This application is a Divisional Application of prior U.S. patent application Ser. No. 13/077,090 filed Mar. 31, 2011, which claims priority under 35 U.S.C. §119 to Korean Application No. 10-2010-0050322 filed on May 28, 2010, whose entire disclosure is hereby incorporated by reference.

BACKGROUND

1. Field

This relates to a hot water supply apparatus, and in particular, to a hot water supply apparatus associated with a heat pump.

2. Background

In general, a hot water supply apparatus uses a heating source to heat water and supply the heated water to a user. An apparatus using a heat pump to heat water and supply the heated water to a user may be referred to as a hot water supply apparatus associated with a heat pump. Such a hot water supply apparatus may include a water supply passage for supplying water, a water storage part for storing the water supplied through the water supply passage, a heating source for heating the supplied water, and a water discharge passage for supplying the heated water to a user.

BRIEF DESCRIPTION OF THE DRAWINGS

The embodiments will be described in detail with reference to the following drawings in which like reference numerals refer to like elements wherein.

DETAILED DESCRIPTION

Reference will now be made in detail to the embodiments of the present disclosure, examples of which are illustrated in the accompanying drawings.

In the following detailed description, reference is made to the accompanying drawings that form a part hereof, and in which is shown by way of illustration specific embodiments which may be practiced. These embodiments are described in sufficient detail to enable those skilled in the art, and it is understood that other embodiments may be utilized and that logical structural, mechanical, electrical, and chemical changes may be made without departing from the spirit or scope as embodied and broadly described herein. To avoid detail not necessary to enable those skilled in the art, the description may omit certain understood information. The following detailed description is, therefore, not to be taken in a limiting sense, and scope is defined by the appended claims.

A heat pump may include a compressor, a condenser in which compressed refrigerant discharged from the compressor is condensed, an expander in which refrigerant from the condenser is expanded, an evaporator in which refrigerant from the expander is evaporated, and a refrigerant pipe connecting the compressor, the condenser, the expander, and the evaporator to form a refrigerant cycle. As refrigerant flows through the heat pump, the refrigerant absorbs heat in the evaporator and emits heat in the condenser. It may be advantageous to transmit this heat to the water in the hot water supply device to heat the water, so that the hot water supply device can perform a hot water supply operation.

Figure 1:
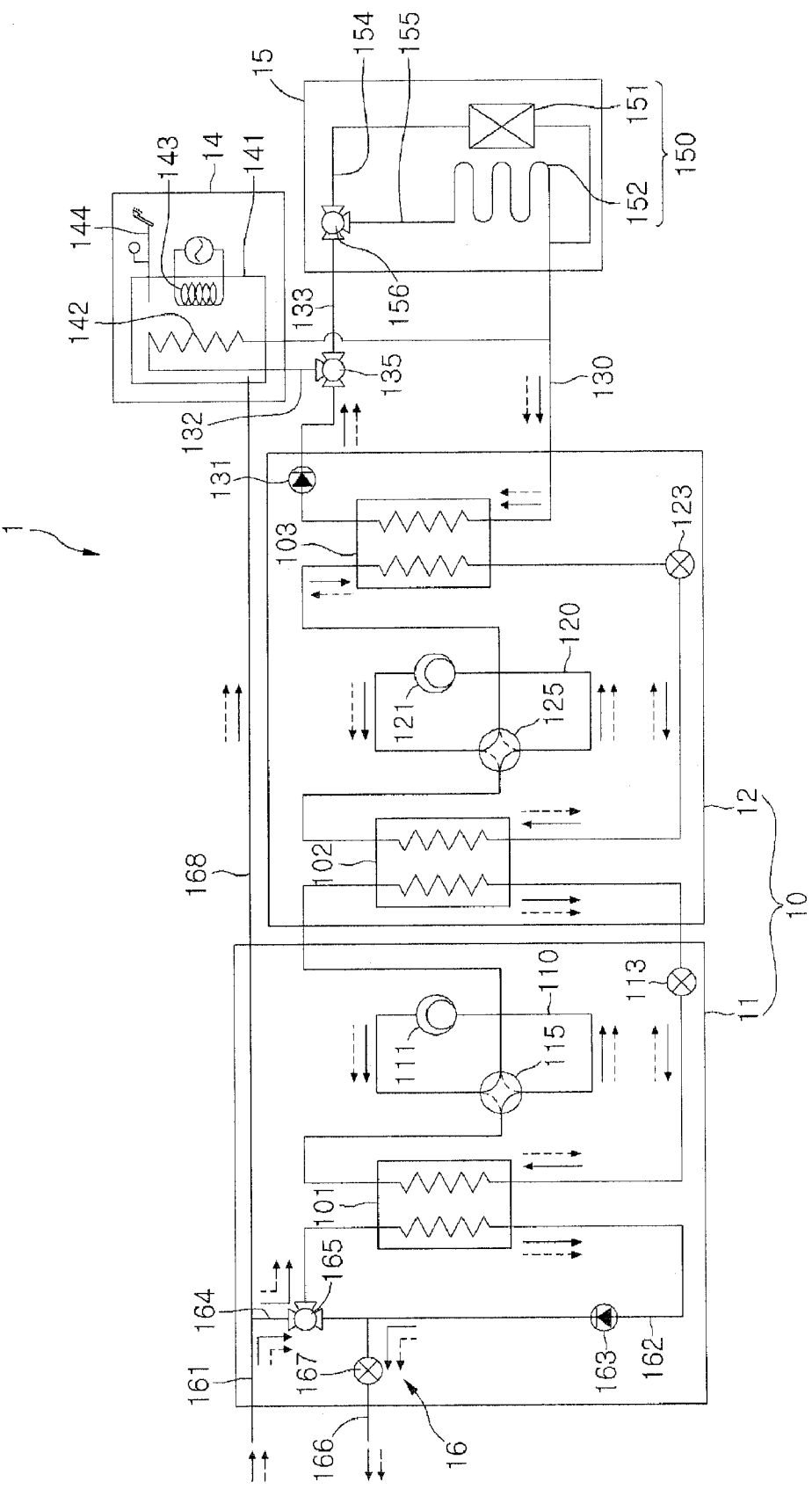
FIG. 1 is a schematic view of a hot water supply apparatus associated with a heat pump, according to an embodiment as broadly described herein.

FIG. 1 is a schematic view of a hot water supply apparatus associated with a heat pump, according to an embodiment as broadly described herein.

Referring to FIG. 1, a hot water supply apparatus 1 associated with a heat pump may include a cascade heat pump 10 including a first refrigerant circulation part 11 forming a first refrigerant cycle, and a second refrigerant circulation part 12 forming a second refrigerant cycle, together forming a two-stage refrigerant cycle, and a hot water supply device 14 using the cascade heat pump 10 to supply hot water.

In detail, the first refrigerant circulation part 11 may include a first compressor 111 compressing a first refrigerant, a cascade heat exchanger 102 exchanging heat between the first refrigerant and a second refrigerant, a first expander 113 expanding the first refrigerant, and a heat source side heat exchanger 101 configured such that the first refrigerant absorbs heat from and emits heat to a heat source.

The second refrigerant circulation part 12 may include a second compressor 121 compressing the second refrigerant, a usage side heat exchanger 103 using the second refrigerant to perform at least one of a hot water supply operation or a heating/cooling operation, a second expander 123 expanding the second refrigerant, and the cascade heat exchanger 102. The cascade heat exchanger 102 may be included in both the first and second refrigerant circulation parts 11 and 12 for heat exchange between the first and second refrigerants.

The usage side heat exchanger 103, the cascade heat exchanger 102, and the heat source side heat exchanger 101 may function as condensers or evaporators based on particular operation conditions. For example, in a heating operation, the usage side heat exchanger 103 may be used as a condenser for the second refrigerant, the cascade heat exchanger 102 may be used as a condenser for the first refrigerant and an evaporator for the second refrigerant, and the heat source side heat exchanger 101 may be used as an evaporator for the first refrigerant. In a cooling operation, the usage side heat exchanger 103 may be used as an evaporator for the second refrigerant, the cascade heat exchanger 102 may be used as an evaporator for the first refrigerant and a condenser for the second refrigerant, and the heat source side heat exchanger 101 may be used as an condenser for the first refrigerant.

The first refrigerant circulation part 11 may also include a first flow switch 115 that switches a flow direction of the first refrigerant discharged from the first compressor 111 to one of the cascade heat exchanger 102 or the heat source side heat exchanger 101, and a first refrigerant pipe 110 connecting the first compressor 111, the first flow switch 115, the cascade heat exchanger 102, the first expander 113, and the heat source side heat exchanger 101. The second refrigerant circulation part 12 may also include a second flow switch 125 that switches a flow direction of the second refrigerant discharged from the second compressor 121 to one of the cascade heat exchanger 102 or the usage side heat exchanger 103, and a second refrigerant pipe 120 connecting the second compressor 121, the second flow switch 125, the cascade heat exchanger 102, the second expander 123, and the usage side heat exchanger 103.

The first and second refrigerants respectively flowing through the heat source side heat exchanger 101 and the usage side heat exchanger 103 may be heat-exchanged with water. That is, heat is exchanged between refrigerant and water at both the heat source side heat exchanger 101 and the usage side heat exchanger 103. The heat source side heat exchanger 101 may be a water-refrigerant heat exchanger that exchanges heat between the first refrigerant and water, and the usage side heat exchanger 103 may be a water-refrigerant heat exchanger that exchanges heat between the second refrigerant and water. Thus, since a defrosting operation of the heat exchangers 101 and 103 may not be necessary, the hot water supply operation and the heating operation may be continuously performed.

The hot water supply apparatus 1 may also include a water pipe 130 in which water that has undergone heat-exchange with the second refrigerant in the usage side heat exchanger 103 flows, a usage side pump 131 that forcibly moves water in the water pipe 130, the hot water supply device 14 using the water heated by the second refrigerant in the usage side heat exchanger 103 to supply the heated water, and a heating/cooling device 15 using the water heat-exchanged with the second refrigerant in the usage side heat exchanger 103 to perform a heating/cooling operation.

The water pipe 130 may be connected to the usage side heat exchanger 103 to move water that has undergone heat-exchange with the second refrigerant in the usage side heat exchanger 103. The water pipe 130 forms a closed loop circuit such that water that has undergone heat-exchange with the second refrigerant in the usage side heat exchanger 103 returns to the usage side heat exchanger 103 through the hot water supply device 14 or the heating/cooling device 15. That is, water passing through the usage side heat exchanger 103 circulates to pass through the hot water supply device 14 or the heating/cooling device 15 along the water pipe 130. The usage side pump 131 may be installed on a side of the water pipe 130 to forcibly move water in the water pipe 130.

The hot water supply device 14 may heat and supply water for various uses. In detail, the hot water supply device 14 includes a hot water supply tank 141 storing water supplied from an external source and heating the stored water, a hot water supply heat exchanger 142 exchanging heat between water passing through the usage side heat exchanger 103 and water stored in the hot water supply tank 141, an auxiliary heater 143 provided in the hot water supply tank 141, and a water discharge passage 144 that supplies hot water from the hot water supply tank 141 to a user.

The hot water supply heat exchanger 142 may be configured in a shape such that water in the hot water supply tank 141 may be heated by water flowing through the water pipe 130. For example, at least a portion of the water pipe 130 may be accommodated in the hot water supply tank 141.

The heating/cooling device 15 may include an indoor heat exchanger 150 that is adjacent to an indoor space to exchange heat between the second refrigerant and the indoor space. The indoor heat exchanger 150 may include an air-conditioning heat exchanger 151 in which heat is exchanged between indoor air and the second refrigerant, and a heat exchanger 152 in which heat is exchanged between an a bottom surface of the indoor space, such as, for example, the floor, and the second refrigerant.

The air-conditioning heat exchanger 151 may be, for example, a fan coil unit in which heat may be exchanged between water and indoor air. The floor heat exchanger 152 may be configured in a shape that allows heat to be exchanged between water and the floor. For example, at least a portion of the water pipe 130 may be installed in the floor.

The hot water supply device 14 may be connected to the heating/cooling device 15 in parallel along the water pipe 130. The water pipe 130 may include a hot water supply pipe 132 branched from a discharge side of the usage side heat exchanger 103 and joining an introduction side of the usage side heat exchanger 103, and a heating/cooling water pipe 133. The hot water supply device 14 may be installed on the hot water supply pipe 132, and the heating/cooling device 15 may be installed on the heating/cooling water pipe 133. A point of the water pipe 130 from which the hot water supply pipe 132 and the heating/cooling water pipe 133 are branched may be provided with a usage side three-way valve 135 switching that switches a flow direction of water such that water passing through the usage side heat exchanger 103 is selectively introduced into one of the hot water supply device 14 or the heating/cooling device 15.

The air-conditioning heat exchanger 151 may be connected to the floor heat exchanger 152 in parallel on the water pipe 130. The heating/cooling water pipe 133 may include an air-conditioning water pipe 154 and a floor water pipe 155, which are branched from each other. The air-conditioning heat exchanger 151 may be installed on the air-conditioning water pipe 154, and the floor heat exchanger 152 may be installed in the floor water pipe 155. A point of the heating/cooling water pipe 133 where the air-conditioning water pipe 154 and the floor water pipe 155 are branched from each other may be provided with a heating/cooling side three-way valve 156 that switches a flow direction of water such that water introduced into the floor water pipe 155 is selectively introduced into one of the air-conditioning heat exchanger 151 or the floor heat exchanger 152.

The hot water supply apparatus 1 may also include a source water supply device 16 in which water to be heat-exchanged with the first refrigerant in the heat source side heat exchanger 101 flows. The source water supply device 16 may include a water supply passage 161 connected to a water supply source, a circulation passage 162 in which water to be heat-exchanged with the refrigerant in the heat source side heat exchanger 101 circulates, a circulation side pump 163 that forcibly moves water in the circulation passage 162, a circulation side supply passage 164 that supplies water to the circulation passage 162, a water supply adjustment device 165 that selectively restricts a supply of water through the circulation side supply passage 164, a circulation side discharge passage 166 that discharges water from the circulation passage 162, and a water discharge adjustment device 167 that selectively discharge of water from the circulation side discharge passage 166.

Since the heat source side heat exchanger 101 is connected to both the circulation passage 162 and the first refrigerant pipe 110, heat may be exchanged in the heat source side heat exchanger 101 between water flowing in the circulation passage 162 and the first refrigerant flowing in the first refrigerant pipe 110.

The water supply passage 161 may be connected to a water supply source capable of continually supplying water, such as a water-supply facility. The circulation side supply passage 164 may connect the water supply passage 161 to the circulation passage 162 to supply water from the water supply source to the circulation passage 162. The water supply adjustment device 165 may be installed on the circulation side supply passage 164 to selectively restrict a supply of water to the circulation passage 162.

The circulation side discharge passage 166 is branched from a side of the circulation passage 162 to guide water flowing in the circulation passage 162 to the outside. The water discharge adjustment device 167 may be installed on the circulation side discharge passage 166 to selectively restrict discharge of water from the circulation passage 162 to the outside.

The circulation side pump 163 may be installed on the circulation passage 162 to forcibly circulate water in the circulation passage 162.

The hot water supply apparatus 1 may also include a hot water supply side supply passage 168 to supply water to the hot water supply device 14. The hot water supply side supply passage 168 connects the water supply passage 161 to the hot water supply device 14 to supply water from the water supply source to the hot water supply device 14. The hot water supply side supply passage 168 may connect the water supply passage 161 to the hot water supply tank 141 to guide water from the water supply source to the hot water supply tank 141 through the water supply passage 161 and the hot water supply side supply passage 168.

Since the circulation side supply passage 164 and the hot water supply side supply passage 168 may be connected to the water supply passage 161 and the water supply source, water may be simultaneously supplied from the water supply source to the circulation passage 162 and the hot water supply device 14 through the circulation side supply passage 164 and the hot water supply side supply passage 168. That is, water flowing in the circulation passage 162 and water stored and heated in the hot water supply device 14 may be supplied from the same water supply source. Thus, the structure of the hot water supply apparatus 1 may be further simplified.

Hereinafter, flows of water and refrigerant in a hot water supply apparatus associated with a heat pump as embodied and broadly described herein will be described in detail with reference to the accompanying drawings.

Referring to FIG. 1, when the hot water supply apparatus 1 is in a hot water supply operation or a heating operation, the first refrigerant discharged from the first compressor 111 is introduced in to the cascade heat exchanger 102. The first refrigerant passing through the cascade heat exchanger 102 heats the second refrigerant and is condensed. The first refrigerant leaving the cascade heat exchanger 102 is expanded through the first expander 113, and is then introduced into the heat source side heat exchanger 101. The first refrigerant introduced into the heat source side heat exchanger 101 absorbs heat from water in the heat source, and is evaporated. The first refrigerant leaving the heat source side heat exchanger 101 is introduced again into the first compressor 111. At this point, the first flow switch 115 communicates a portion of the first refrigerant pipe 110 at the discharge side of the first compressor 111 with a portion of the first refrigerant pipe 110 at the introduction side of the cascade heat exchanger 102, and maintains communication between a portion of the first refrigerant pipe 110 at the discharge side of the heat source side heat exchanger 101 and a portion of the first refrigerant pipe 110 at the introduction side of the first compressor 111.

The second refrigerant discharged from the second compressor 121 is introduced into the usage side heat exchanger 103. The second refrigerant passing through the usage side heat exchanger 103 heats water at the usage side and is condensed. The second refrigerant discharged from the usage side heat exchanger 103 is expanded through the second expander 123, and is then introduced into the cascade heat exchanger 102. The second refrigerant introduced into the cascade heat exchanger 102 absorbs heat from the first refrigerant, and is evaporated. The second refrigerant discharged from the cascade heat exchanger 102 is introduced again into the second compressor 121. At this point, the second flow switch 125 communicates a portion of the second refrigerant pipe 120 at the discharge side of the second compressor 121 with a portion of the second refrigerant pipe 120 at the introduction side of the usage side heat exchanger 103, and maintains communication between a portion of the second refrigerant pipe 120 at the discharge side of the cascade heat exchanger 102 and a portion of the second refrigerant pipe 120 at the introduction side of the second compressor 121.

Next, water discharged from the usage side pump 131 may be introduced into the hot water supply device 14 or the heating/cooling device 15. The usage side three-way valve 135 may introduce the water into the hot water supply device 14 in the hot water supply operation, and may introduce the water into the heating/cooling device 15 in the heating operation.

Water introduced into the hot water supply device 14 flows in the hot water supply heat exchanger 142 along the water pipe 130 at the hot water supply side and heats water stored in the hot water supply tank 141, and is then discharged from the hot water supply device 14. The water discharged from the hot water supply device 14 passes through the usage side heat exchanger 103 along the water pipe 130 at the usage side and is heated to a high temperature by the refrigerant, and is then introduced again into the usage side pump 131, and thus water may be continuously circulated.

The water introduced into the heating/cooling device 15 is introduced along the heating/cooling water pipe 133 to the indoor heat exchanger 150. In more detail, the water introduced into the heating/cooling device 15 may be selectively introduced into one of the air-conditioning heat exchanger 151 or the bottom heat exchanger 152 by the heating/cooling side three-way valve 156. The water introduced into the air-conditioning heat exchanger 151 heats indoor air, and the water introduced into the floor heat exchanger 152 heats the floor. The water passing through the one of the air-conditioning heat exchanger 151 or the floor heat exchanger 152 is introduced to the usage side heat exchanger 103 along the water pipe 130 at the usage side. The water passing through the usage side heat exchanger 103 is heated by the refrigerant, and is then introduced again into the usage side pump 131 so that the water may continuously circulate.

Water from the water supply source is introduced through the water supply passage 161 and the circulation side supply passage 164 into the circulation passage 162. The water supply adjustment device 165 maintains communication between the circulation side supply passage 164 and the circulation passage 162. The water introduced into the circulation passage 162 passes through the heat source side heat exchanger 101 and heats the refrigerant, and is then discharged through the circulation side pump 163 and the circulation side discharge passage 166 to the outside.

At this point, the water at the heat source side is forcibly circulated by the circulation side pump 163. However, when the water supply source, such as a water supply facility, has its own pressure, the pressure of the water supply source may be sufficient to move the water in the circulation passage 162.

A freezing and bursting prevention operation and a water saving operation may be performed during a heating or cooling operation. When at least one of the freezing and bursting prevention operation or the water saving operation is performed, water may flow in the circulation passage 162 while a water supply and a water discharge from the circulation passage 162 is prevented. In this case, the circulation side pump 163 is necessary.

When the hot water supply apparatus 1 is in the cooling operation, a flow direction of the refrigerant may be changed. In more detail, the first refrigerant discharged from the first compressor 111 may move sequentially through the cascade heat exchanger 102, the first expander 113, and the heat source side heat exchanger 101, and then be introduced again into the first compressor 111. The second refrigerant discharged from the second compressor 121 may move sequentially through the usage side heat exchanger 103, the second expander 123, and the cascade heat exchanger 102, and then be introduced again into the second compressor 121. The water flow at the heat source side is essentially the same as that in the heating operation, and the water at the usage side circulates through the heating/cooling device 15 and the usage side heat exchanger 103. The hot water supply apparatus 1 may perform both the heating operation and the hot water supply operation.

A hot water supply apparatus 1 as embodied and broadly described herein may improve installation characteristics since refrigerant passing through the heat source side heat exchanger 101 and the usage side heat exchanger 103 are heat-exchanged with water. More specifically, both the heat source side heat exchanger 101 and the usage side heat exchanger 103 may be water-refrigerant heat exchangers in which heat is exchanged between water and refrigerant. In general, since a heat exchange density between water and refrigerant is higher than a heat exchange density between air and refrigerant, the volume of a water-refrigerant heat exchanger may be less than the volume of an air-refrigerant heat exchanger providing the same heat exchange capacity. Therefore, the water-refrigerant heat exchanger may occupy a relatively smaller installation space, and thus, may be installed in a relatively small space.

In addition, a water-refrigerant heat exchanger may be installed in indoor and/or outdoor spaces. Thus, the heat source side heat exchanger 101 and the usage side heat exchanger 103 may be installed in a variety of spaces.

Degradation due to operation in outdoor conditions may also be minimized. More specifically, since water has a higher specific heat than air, water is less affected by outdoor temperature. Thus, heat source side water, that is, circulation water, is affected less by temperature variation than outside air. Thus, degradation due to variations in outdoor conditions, such as outdoor temperatures, may be minimized.

In addition, in both the heat source side heat exchanger 101 and the usage side heat exchanger 103, heat is exchanged between water and refrigerant, and thus frost may be prevented from forming on the surfaces of the heat source side heat exchanger 101 and the usage side heat exchanger 103. Thus, a defrosting operation may be unnecessary, and the hot water supply operation and the heating operation may be continuously performed.

Since the heat pump 10 uses a two-stage refrigerant cycle, that is, a cascade method, hot water supply performance and heating performance may be further improved. In more detail, a refrigerant temperature at a condensation end in a two-stage refrigerant cycle is higher than a refrigerant temperature at a condensation end in a single-stage refrigerant cycle. Thus, the hot water supply operation using the condensation end in the two-stage refrigerant cycle may have better hot water supply performance than the hot water supply operation using the condensation end in the single-stage refrigerant cycle.

Furthermore, since a fan for forcibly moving outdoor air may be unnecessary, noise may be further reduced during operation.

Hereinafter, a freezing and bursting prevention operation and a water saving operation of a hot water supply apparatus associated with a heat pump as embodied and broadly described herein will be described in detail with reference to the accompanying drawings.

Figure 2:
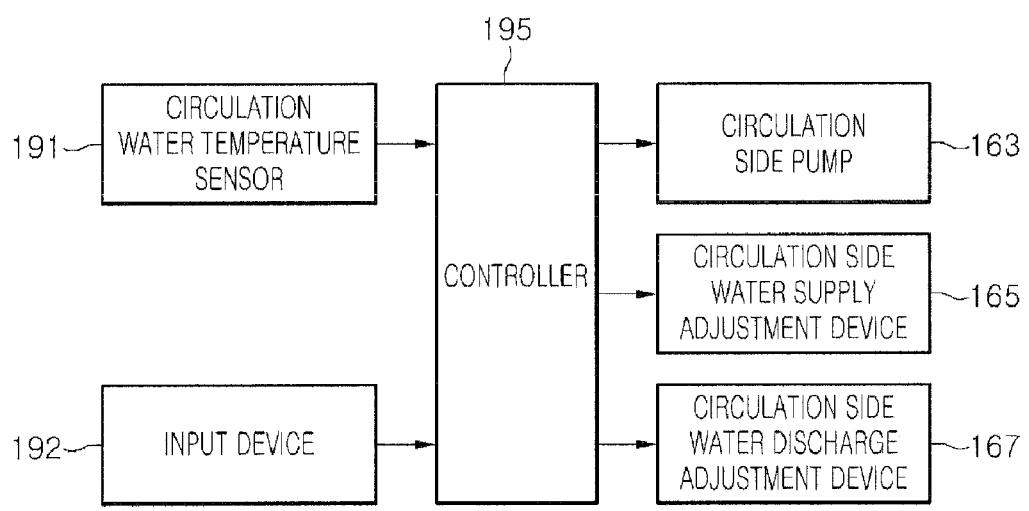
FIG. 2 is a block diagram of a hot water supply apparatus associated with a heat pump, according to an embodiment as broadly described herein.
Figure 3:
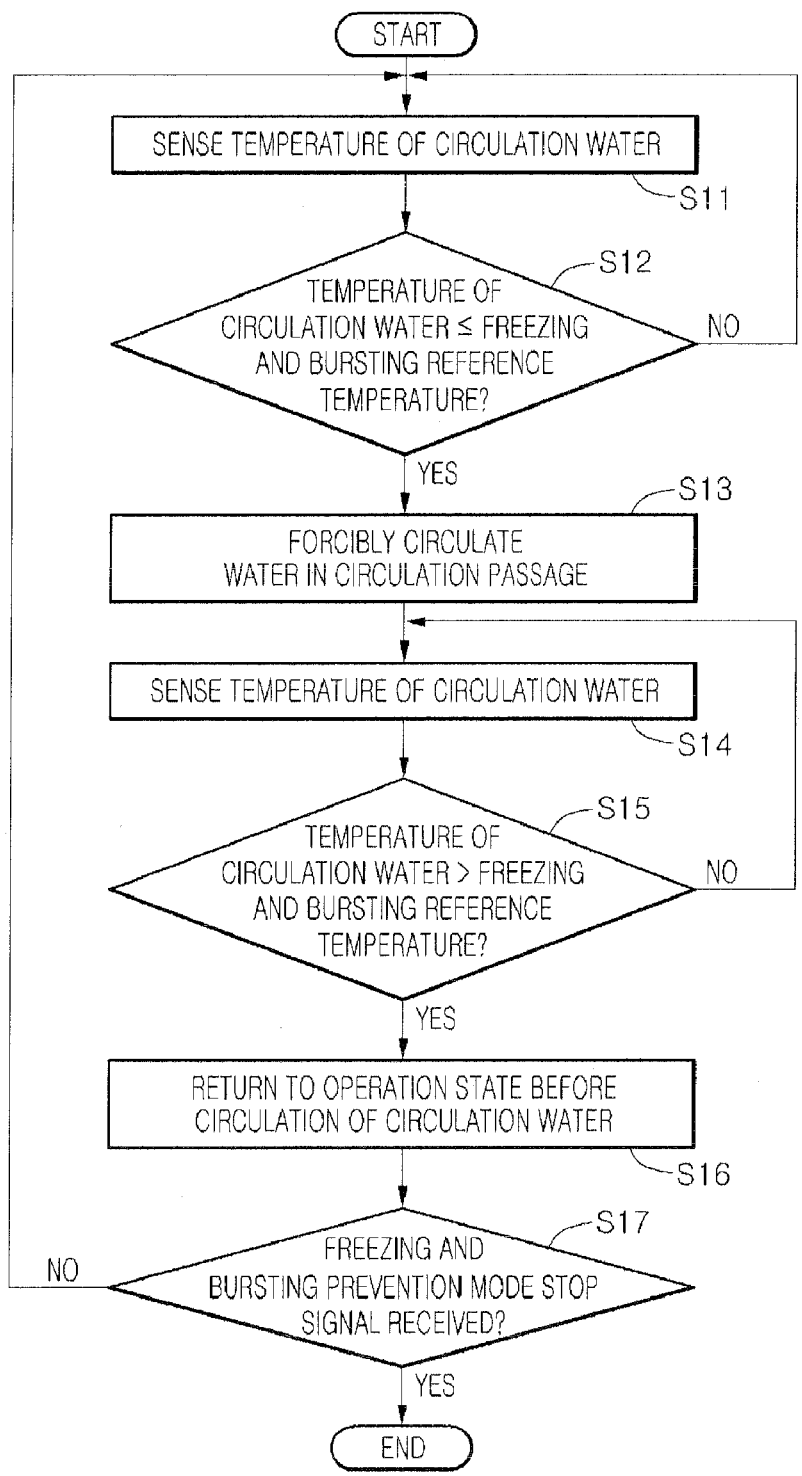
FIG. 3 is a flowchart of operation of a hot water supply apparatus associated with a heat pump in a freezing and bursting prevention operation, according to an embodiment as broadly described herein.
Figure 4:
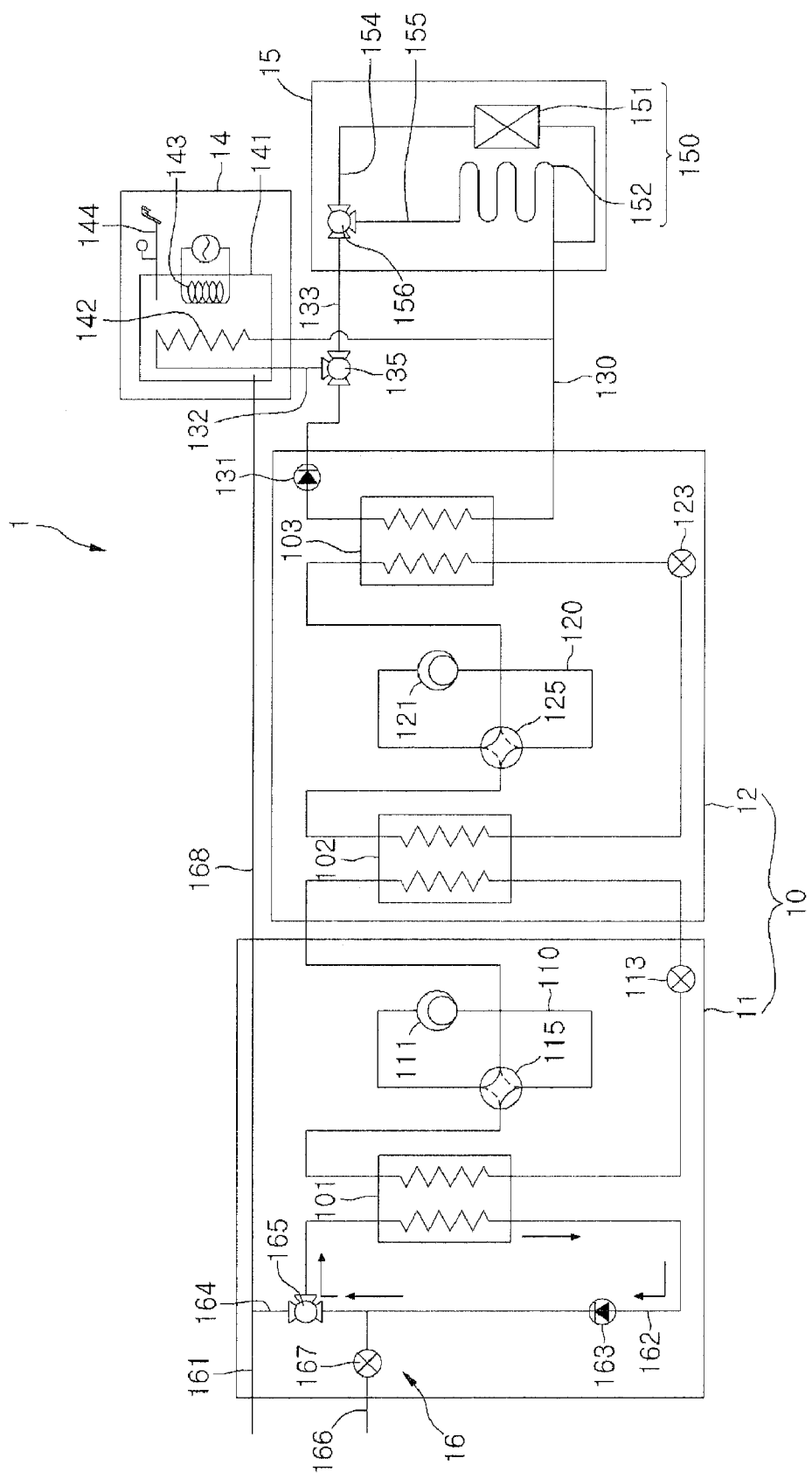
FIG. 4 is a schematic view of a circulation of heat source side water in a hot water supply apparatus associated with a heat pump, according to an embodiment as broadly described herein.
Figure 5:
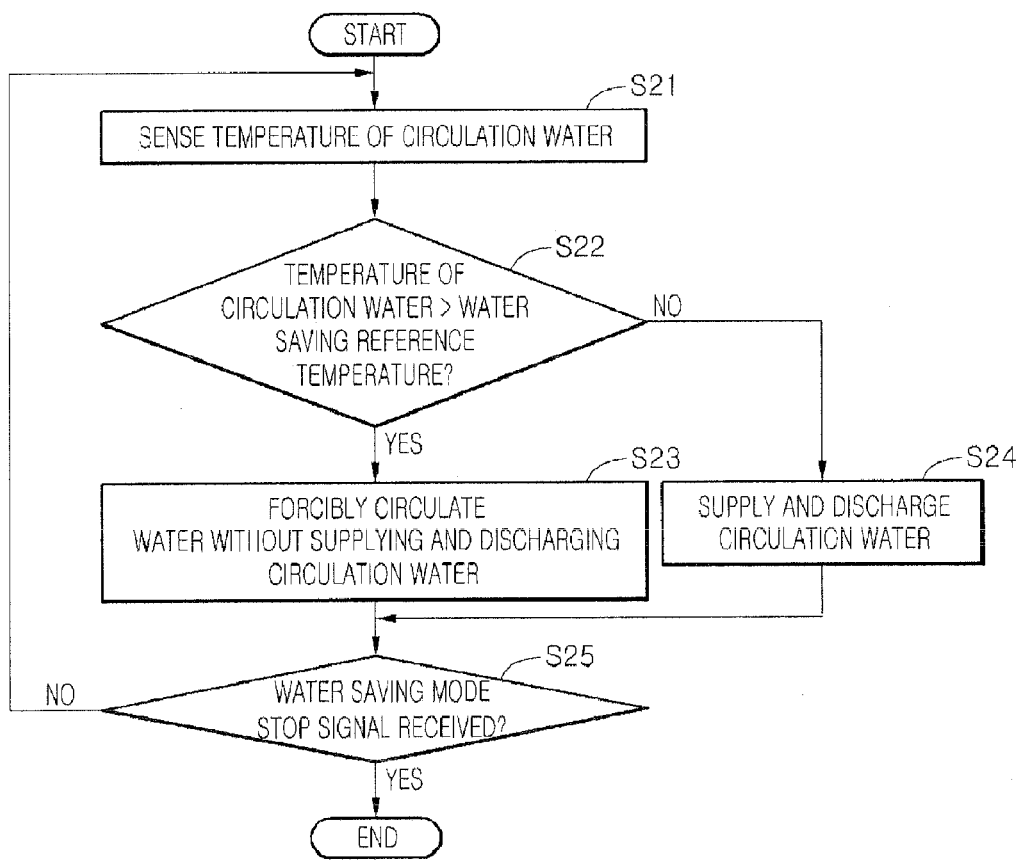
FIG. 5 is a flowchart of operation of a hot water supply apparatus associated with a heat pump in a water saving operation, according to an embodiment as broadly described herein.

FIG. 2 is a block diagram of a hot water supply apparatus associated with a heat pump, according to an embodiment as broadly described herein, and FIG. 3 is a flowchart of a freezing and bursting prevention operation, according to an embodiment as broadly described herein. FIG. 4 is a schematic view of circulation of heat source side water in a hot water supply device associated with a heat pump, according to an embodiment as broadly described herein, and FIG. 5 is a flowchart of a water saving operation, according to an embodiment as broadly described herein.

Referring to FIG. 2, the hot water supply apparatus 1 may also include a circulation water temperature sensor 191 for sensing the temperature of heat source side water, that is, the temperature of circulation water, an input device 192 for inputting/receiving various signals/commands for operation control, and a controller 195 controlling the operation of the circulation side pump 163, the operation of the water supply adjustment device 165 at the circulation side, and the operation of the water discharge adjustment device 167 at the circulation side based on a temperature sensed by the circulation water temperature sensor 191 and/or a signal received at the input device 192. The circulation water temperature sensor 191, the input device 192, the controller 195, the circulation side pump 163, the water supply adjustment device 165, and the water discharge adjustment device 167 are electrically connected to one another to transmit and receive control signals.

The circulation water temperature sensor 191 may be installed at the circulation passage 162 to sense the temperature of water flowing in the circulation passage 162. The input device 192 may be provided, for example, at the heating/cooling device 15, the hot water supply device 14, a remote control or other location such that a user can easily input a signal/command.

Referring to FIG. 3, when the hot water supply apparatus 1 is in the freezing and bursting prevention operation, first, the temperature of the circulation water is sensed, for example, by the circulation water temperature sensor 191 (S11).

If the temperature of the circulation water is greater than a freezing and bursting reference temperature (S12), the temperature of the circulation water is repeatedly sensed (S11) and compared with the freezing and bursting reference temperature (S12).

However, if the temperature of the circulation water is less than or equal to the freezing and bursting reference temperature (S12), the circulation water is forcibly moved to circulate through the circulation passage 162 by, for example, the circulation side pump 163 (S13). The freezing and bursting reference temperature may denote a threshold temperature at which circulation water may be frozen. For example, the freezing and bursting reference temperature may be approximately 0° C.

Referring to FIG. 4, the circulation water circulates through the circulation passage 162. First, water discharged from the circulation side pump 163 flows along the circulation passage 162 and is introduced into the usage side heat exchanger 103. Then, the circulation water passing through the usage side heat exchanger 103 heats the refrigerant, and is then introduced again into the circulation side pump 163 so that water may continuously circulate through the circulation passage 162.

The water discharge adjustment device 167 closes the circulation side discharge passage 166 to prevent the discharge of water from the circulation passage 162, and the water supply adjustment device 165 closes the circulation side supply passage 164 to prevent the supply of water to the circulation passage 162. Thus, the circulation water circulates in a closed loop along the circulation passage 162. Even when the temperature of the circulation water is less than or equal to the freezing and bursting reference temperature, freezing of the circulation water may be minimized and/or delayed.

Next, referring back to FIG. 3, the temperature of the circulation water is sensed again (S14). If the temperature of the circulation water is less than or equal to the freezing and bursting reference temperature (S15), the temperature of the circulation water is repeatedly sensed (S14) and compared with the freezing and bursting reference temperature (S15).

However, if the temperature of the circulation water is greater than the freezing and bursting reference temperature (S15), an operation state of the apparatus prior to the circulation of the circulation water (S13) in resumed (S16). For example, if the hot water supply apparatus 1 is stopped before the circulation water circulates (S13) to prevent freezing and bursting, when the temperature of the circulation water after the circulation water circulates is greater than the freezing and bursting reference temperature, the hot water supply apparatus 1 is once again stopped.

After the prior operation state is resumed (S16), the temperature of the circulation water is sensed (S11) until a signal for stopping the freezing and bursting prevention operation is received (S17).

Referring to FIG. 5, when the hot water supply apparatus 1 is in the water saving operation, first, the temperature of the circulation water is sensed (S21). Then, if the temperature of the circulation water is greater than a water saving reference temperature (S22), the circulation water circulates through the circulation passage 162 without supply and discharging the circulation water (S23).

The water saving reference temperature may denote the minimum temperature value of the circulation water within a range where a given heating performance and a given hot water supply performance may be satisfied. For example, when the hot water supply apparatus 1 is in the heating and hot water supply operations, the circulation water heats the refrigerant through the usage side heat exchanger 103, and thus the temperature of the circulation water continually decreases, reducing the temperature difference between the refrigerant and the circulation water passing through the usage side heat exchanger 103 and degrading heating and hot water supply performance. In this case, a minimum comfortable heating performance and a minimum comfortable hot water supply performance may be determined, and a corresponding minimum temperature of the circulation water may be determined such that a heating performance and a hot water supply performance produced by the apparatus 1 are greater than or equal to the minimum comfortable heating performance and the minimum comfortable hot water supply performance. That is, when the temperature of the circulation water is greater than the water saving reference temperature, the heating performance and the hot water supply performance may be maintained within a range where a user feels comfortable.

However, if the temperature of the circulation water is less than or equal to the water saving reference temperature in operation S22, the circulation water is supplied and discharged (S24). That is, since the water supply adjustment device 165 and the water discharge adjustment device 167 open the circulation side supply passage 164 and the circulation side discharge passage 166, water from the water supply source is supplied to the circulation passage 162, and simultaneously, the circulation water is discharged from the circulation passage 162 to the outside.

This allows circulation water circulating through the circulation passage 162 to be discharged, and new circulation water to circulate through the circulation passage 162. The temperature of the new circulation water introduced into the circulation passage 162 is greater than that of the discharged water after circulating through the circulation passage 162. Thus, the temperature of the circulation water may be maintained at greater than the water saving reference temperature. That is, the heating performance and the hot water supply performance may be maintained within a range where a user feels comfortable.

Finally, if a signal for stopping the water saving operation is not received (S25), the temperature of the circulation water is sensed again (S21).

The water saving operation may save water flowing in the circulation passage 162. In more detail, if the temperature of the circulation water is greater than the water saving reference temperature, the circulation water circulates through the circulation passage 162 without supply and discharge of the circulation water, so that an amount of consumed circulation water per unit time is reduced. If the temperature of the circulation water is less than or equal to the water saving reference temperature, the circulation water is supplied and discharged, so that the temperature of the circulation water circulating through the circulation passage 162 may be maintained at greater than the water saving reference temperature. Thus, the amount of water flowing through the circulation passage 162 may be minimized, and simultaneously, heating performance and hot water supply performance may be maintained.

When the hot water supply apparatus 1 is in the cooling operation, if the temperature of the circulation water does not reach a reference temperature, the circulation water is circulated through the circulation passage 162, and thus water may be saved, and simultaneously, cooling performance may be maintained. The reference temperature may denote the maximum temperature value of the circulation water within a range where a required cooling performance may be satisfied.

The freezing and bursting prevention operation may be performed when the hot water supply apparatus 1 is stopped. The water saving operation may be performed simultaneously with the hot water supply operation, the heating operation, or the cooling operation.

Hereinafter, a hot water supply apparatus associated with a heat pump according to another embodiment will now be described with respect to FIG. 6. This embodiment is different from the embodiment shown in FIGS. 1 and 4 in that refrigerant may be excessively cooled, or sub-cooled. This embodiment may include elements similar to elements discussed above with respect to previous embodiment(s). Similar elements will be labeled with the same reference numerals and duplicative description thereof will be omitted wherever possible.

Figure 6:
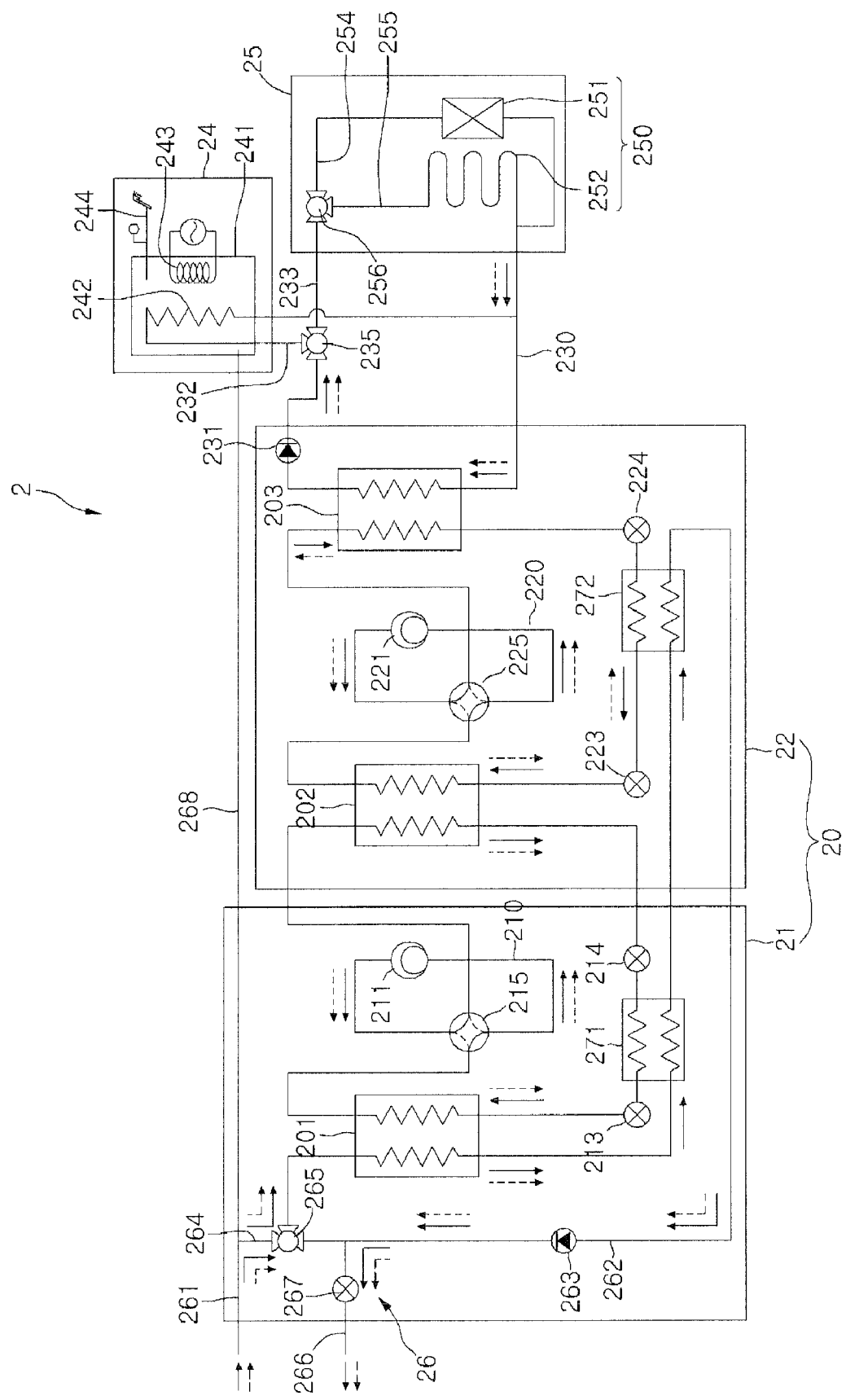
FIG. 6 is a schematic view of a hot water supply apparatus associated with a heat pump, according to another embodiment as broadly described herein.

Referring to FIG. 6, the hot water supply apparatus 2 may include a heat pump 20 including first and second refrigerant circulation parts 21 and 22, and subcoolers 271 and 272 including a first subcooler 271 that subcools a first refrigerant, and a second subcooler 272 that subcools a second refrigerant. In such a subcooler, fluid may be subcooled, or compressed, to a temperature that is lower than a freezing temperature thereof for a given pressure, below its freezing point, without solidifying. Such a subcooler may be employed to improve energy efficiency of a system in which it is installed. The first subcooler 271 is installed between a cascade heat exchanger 202 and a first expander 213 on a first refrigerant cycle. The second subcooler 272 is installed between a usage side heat exchanger 203 and a second expander 223 on a second refrigerant cycle.

The subcoolers 271 and 272 are installed at points corresponding to a discharge side of a heat source side heat exchanger 201 on a circulation passage 262. The subcoolers 271 and 272 may each be a water-refrigerant heat exchanger accommodating a water passage and a refrigerant passage that are adjacent to each other to exchange heat between water and refrigerant.

When the hot water supply device 2 is in a heating operation, the first refrigerant heating the second refrigerant through the cascade heat exchanger 202, and the second refrigerant heating usage side water through the usage side heat exchanger 203 may heat the heat source side water, that is, circulation water through the subcoolers 271 and 272 and be subcooled.

Water, which heats refrigerant through the heat source side heat exchanger 201 and is cooled, may be heated by absorbing heat from refrigerant through the subcoolers 271 and 272. Thus, when the hot water supply apparatus 2 is in a water saving operation, a temperature decrease rate of the circulation water may be decreased. That is, since circulation time of the circulation water may be increased in the water saving operation, the overall amount of water saved may increase, and a water saving effect may be improved.

A cooling expander 214 may be installed between the first subcooler 271 and the cascade heat exchanger 202, and a cooling expander 224 may be installed between the second subcooler 272 and the usage side heat exchanger 203. When the hot water supply apparatus 2 is in a cooling operation, the first expander 213 and the second expander 223 are completely opened, and refrigerants pass through the first and second subcoolers 271 and 272 and are expanded in the cooling expanders 214 and 224. Thus, the refrigerant condensed through the heat source side heat exchanger 201 emits heat to the heat source side water in the subcoolers 271 and 272 and may be subcooled.

The hot water supply apparatus 2 associated with the heat pump in accordance with the embodiment shown in FIG. 6 may also include first and second refrigerant pipes 210/220, first and second compressors 211/221, first and second flow adjustment switches 215/225, a hot water supply device 24 including a storage tank 241, hot water supply heat exchanger 242, auxiliary heater 243 and water discharge passage 244, a heating/cooling device 25 including an indoor heat exchanger 250 having an air conditioning heat exchanger 251 and a floor heat exchanger 252, an air conditioning water pipe 254 and a floor water pipe 255 and a heating/cooling side three way valve 256, a source water supply device 26 including a water supply passage 261, circulation side pump 263, circulation side supply passage 264, water supply adjustment device 265, circulation side discharge passage 266, water discharge adjustment device 267 and hot water supply side supply passage 268, and a water pipe 230, usage side pump 231, hot water supply pipe 232, heating/cooling water pipe 233 and usage side three way valve 235. These components are similar to corresponding components discussed above with respect to previous embodiment(s), and thus further detailed description will be omitted.

Hereinafter, a hot water supply apparatus associated with a heat pump according to another embodiment will now be described with respect to FIG. 7. This embodiment is different from the embodiment shown in FIGS. 1 and 4 in that an air-conditioning heat exchanger is connected onto a refrigerant pipe. This embodiment may include elements similar to elements discussed above with respect to previous embodiment(s). Similar elements will be labeled with the same reference numerals and duplicative description thereof will be omitted wherever possible.

Figure 7:
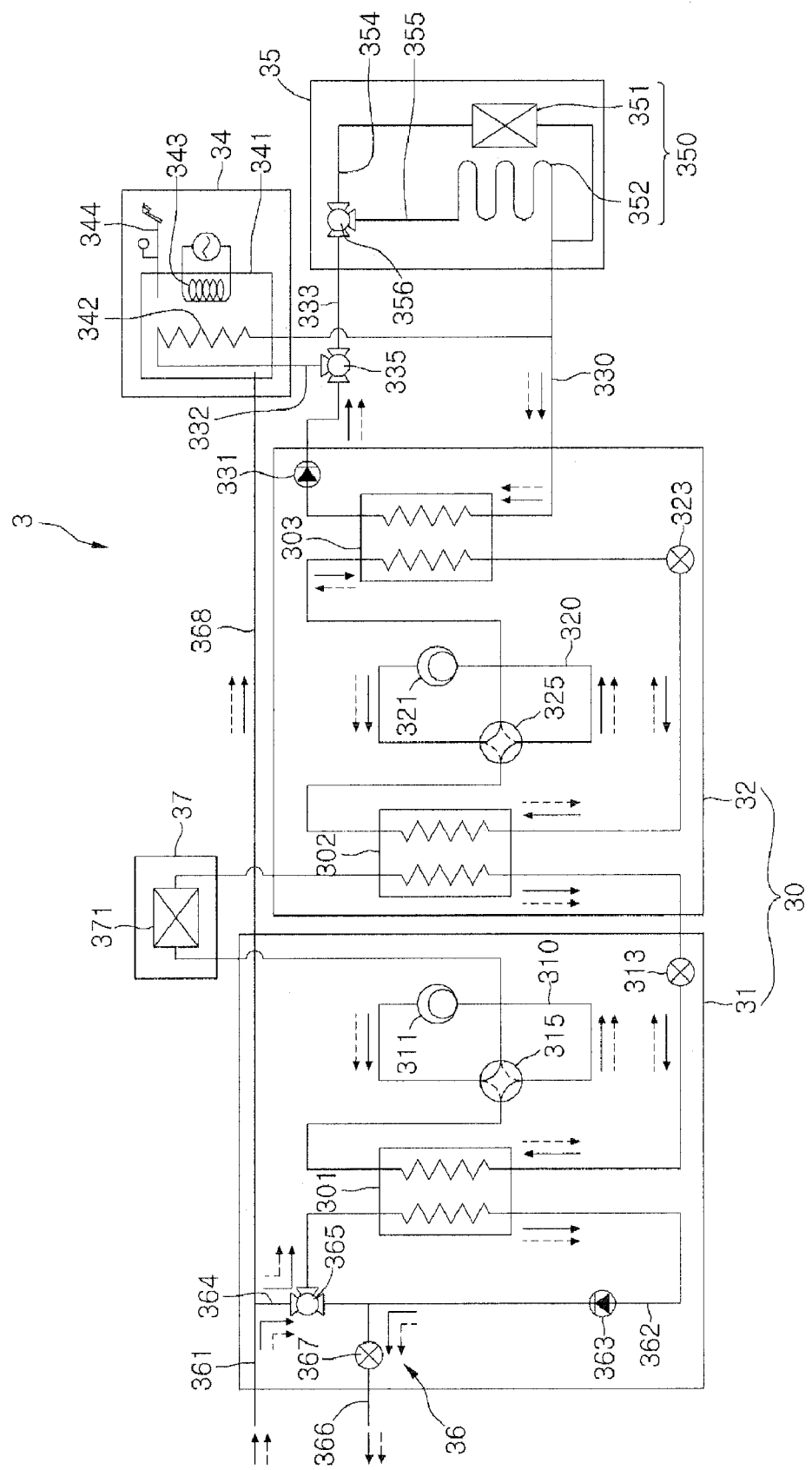
FIG. 7 is a schematic view of a hot water supply apparatus associated with a heat pump, according to another embodiment as broadly described herein.

Referring to FIG. 7, the hot water supply apparatus 3 may include a heat pump 30 including first and second refrigerant circulation parts 31 and 32, and an air-conditioning heat exchanger 371 connected to a refrigerant pipe 310 to heat or cool indoor air in a heating or cooling operation. The air-conditioning heat exchanger 371 may be installed between a first compressor 311 and a cascade heat exchanger 302 on a first refrigerant cycle. That is, the air-conditioning heat exchanger 371 may be installed at an upstream side of the cascade heat exchanger 302 along a flow direction of a first refrigerant. Thus, when the hot water supply apparatus 3 is in the heating operation, the first refrigerant discharged from the first compressor 311 heats indoor air through the air-conditioning heat exchanger 371 to heat an indoor space.

When the hot water supply apparatus 3 is in the cooling operation, the refrigerant passing through a heat source side heat exchanger 301 is expanded through an expander 313, and then cools indoor air through the air-conditioning heat exchanger 371 to cool the indoor space. The air-conditioning heat exchanger 371 may be accommodated in an indoor device 37 in the indoor space so as to be exposed to the indoor air.

In this embodiment, heating performance and cooling performance may be improved. In more detail, the indoor air may be directly heated or cooled using the refrigerant, and thus a heat transfer amount between the refrigerant and the indoor air may be greater when compared to a method in which indoor air is heated or cooled using water heated or cooled by refrigerant.

In particular, heating performance and cooling performance may be improved simultaneously. The first refrigerant discharged from the first compressor 311 passes through the air-conditioning heat exchanger 371 first and is primarily condensed, and then, passes through the cascade heat exchanger 302. Since the refrigerant is at a maximum temperature in the first refrigerant cycle during the heating operation, heating performance may be improved. The heat pump 30 may incorporate a two-stage refrigerant cycle, such as, for example, a cascade cycle, in which a condenser at a high stage, that is, a usage side heat exchanger 303 performs a hot water supply operation, and thus, hot water supply performance may be improved compared to a heat pump incorporating a single-stage refrigerant cycle. Thus, hot water supply performance and heating performance may be simultaneously improved.

The hot water supply apparatus 3 associated with the heat pump in accordance with the embodiment shown in FIG. 7 may also include a refrigerant pipe 320, compressor 321, expansion device 323, flow adjustment switch 325, a hot water supply device 34 including a storage tank 341, hot water supply heat exchanger 342, auxiliary heater 343 and water discharge passage 344, a heating/cooling device 35 including an indoor heat exchanger 350 having an air conditioning heat exchanger 351 and a floor heat exchanger 352, an air conditioning water pipe 354 and a floor water pipe 355 and a heating/cooling side three way valve 356, a source water supply device 36 including a water supply passage 361, circulation passage 362, circulation side pump 363, circulation side supply passage 364, water supply adjustment device 365, circulation side discharge passage 366, water discharge adjustment device 367 and hot water supply side supply passage 368, and a water pipe 330, usage side pump 331, hot water supply pipe 332, heating/cooling water pipe 333 and usage side three way valve 335. These components are similar to corresponding components discussed above with respect to previous embodiment(s), and thus further detailed description will be omitted.

Hereinafter, a hot water supply apparatus associated with a heat pump according to another embodiment will now be described with respect to FIG. 8. This embodiment is different from the embodiment shown in FIGS. 1 and 4 in that a hot water supply device and a lower surface, or floor, heating/cooling device thereof may employ a desuperheater. This embodiment may include elements similar to elements discussed above with respect to previous embodiment(s). Similar elements will be labeled with the same reference numerals and duplicative description thereof will be omitted wherever possible.

Figure 8:
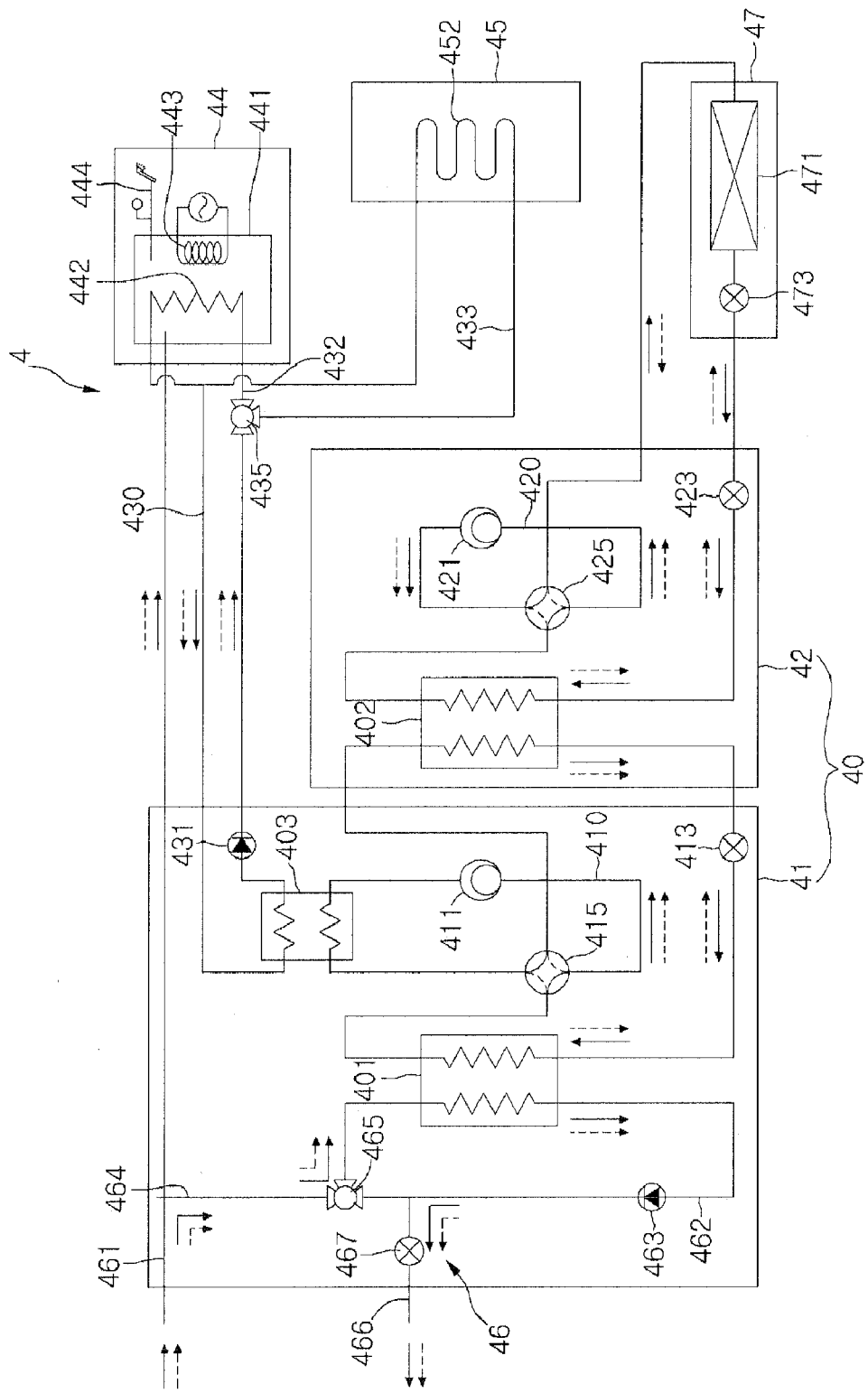
FIG. 8 is a schematic view of a hot water supply apparatus associated with a heat pump, according to another embodiment as broadly described herein.

Referring to FIG. 8, the hot water supply apparatus 4 may include a hot water supply device 44 and a floor heating/cooling device 45 that employ a desuperheater. Such a desuperheater may function as a waste heat recovery device that recovers superheat from compressor discharge gas to supplement a heating or a hot water supply operation. Thus, a desuperheater heat exchanger 403 may function as a primary condenser in which the refrigerant at a discharge side of a first compressor 411 is primarily condensed, and a cascade heat exchanger 402 or a heat source side heat exchanger 401 may function as a secondary condenser in which the refrigerant at the discharge side of the first compressor 411 is secondarily condensed.

In this embodiment, a water pipe 430 guiding the water heated by the first refrigerant in the desuperheater heat exchanger 403 to the hot water supply device 44 or the floor heating/cooling device 45, and a usage side pump 431 forcibly moving the water in the water pipe 430 may also be provided. A heat pump 40 may include a first refrigerant circulation part 41 including the desuperheater heat exchanger 403 in which the first refrigerant is heat-exchanged with water. That is, the desuperheater heat exchanger 403 may be connected simultaneously to a first refrigerant pipe 410 and the water pipe 430 such that the first refrigerant is heat-exchanged with the water.

The desuperheater heat exchanger 403 may be installed between the first compressor 411 and a first flow switch 415 on a first refrigerant cycle so as to perform a hot water supply operation and a floor heating operation regardless of switching between heating and cooling. Thus, even when a refrigerant flow direction is varied by the first flow switch 415 corresponding to heating or cooling, the first refrigerant at the discharge side of the first compressor 411 passes through the desuperheater heat exchanger 403.

The hot water supply device 44 may be connected in parallel to the floor heating/cooling device 45 with respect to the water pipe 430, and a usage side three-way valve 435 may direct the water passing through the desuperheater heat exchanger 403 to the hot water supply device 44 or the floor heating/cooling device 45.

A second refrigerant circulation part 42 of the heat pump 40 may include a second compressor 421, an indoor device 47 including an air-conditioning heat exchanger 471 in which a second refrigerant is heat-exchanged with indoor air, second expanders 423 and 473, and the cascade heat exchanger 402. The air-conditioning heat exchanger 471 may be installed separately from the floor heating/cooling device 45, and in particular, a floor heat exchanger 452, and the air-conditioning heat exchanger 471 uses the second refrigerant to heat or cool the indoor space.

In the this embodiment, in the hot water supply operation or the floor heating operation, the first refrigerant at the discharge side of the first compressor 411 heats the usage side water through the desuperheater heat exchanger 403 and is primarily condensed, and then, is introduced into the cascade heat exchanger 402 or the heat source side heat exchanger 401 through the first flow switch 415.

The hot water supply operation or the floor heating operation may be performed simultaneously with the air-conditioning heating or cooling operation. When the air-conditioning heating operation is performed simultaneously with the hot water supply operation or the floor heating operation, the first refrigerant passing through the desuperheater heat exchanger 403 is introduced into the cascade heat exchanger 402, and heats the second refrigerant through the cascade heat exchanger 402 and is secondarily condensed, and is introduced again into the first compressor 411 through a first expander 413 and the heat source side heat exchanger 401.

When the cooling operation is performed simultaneously with the hot water supply operation or the floor heating operation, the first refrigerant passing through the desuperheater heat exchanger 403 heats the heat source side water through the heat source side heat exchanger 401 and is secondarily condensed, and is then introduced into the cascade heat exchanger 402 through the first expander 413. The first refrigerant passing through the cascade heat exchanger 402 cools the second refrigerant and is evaporated, and is then introduced again into the first compressor 411.

The second refrigerant of the second refrigerant circulation part 42 flows sequentially through the second compressor 421, the air-conditioning heat exchanger 471, the second expanders 473 and 423, and the cascade heat exchanger 402 in the air-conditioning heating operation, and flows sequentially through the second compressor 421, the cascade heat exchanger 402, the second expanders 423 and 473, and the air-conditioning heat exchanger 471 in the air-conditioning cooling operation.

The usage side water is forcibly moved by the usage side pump 431, and continually circulates between the desuperheater heat exchanger 403 and one of a hot water supply heat exchanger 442 or the floor heat exchanger 452. At this point, the usage side water absorbs heat from the first refrigerant when passing through the desuperheater heat exchanger 403, and heats water in a hot water supply tank 441 or the floor when passing through one of the hot water supply heat exchanger 442 or the floor heat exchanger 452. Based on a position of the usage side three-way valve 435, the usage side water may selectively flow to one of the hot water supply heat exchanger 442 or the floor heat exchanger 452.

In this embodiment, hot water supply performance and heating performance may both be improved. Since the first refrigerant at the discharge side of the first compressor 411 at a maximum temperature state in the first refrigerant cycle is introduced directly into the desuperheater heat exchanger 403, that is, since the hot water supply operation is performed using the first refrigerant at the maximum temperature on the first refrigerant cycle, hot water supply performance may be improved. Although heating performance may be degraded due to some removal condensation heat from the first refrigerant during the hot water supply operation, the two-stage cycle heat pump 40 may compensate for this degradation and further improve the heating performance.

The hot water supply operation may be continuously performed regardless of switching between heating and cooling. In more detail, the first refrigerant discharged from the first compressor 411 passes through the desuperheater heat exchanger 403 first, regardless of a refrigerant flow direction change by the first flow switch 415. Thus, the hot water supply operation may be performed regardless of switching between heating and cooling.

In addition, the floor heating operation and the indoor cooling operation may be simultaneously performed. For example, it may be necessary to dry a floor and cool an indoor space in a wet and hot season, such as, for example a rainy season. In this case, the first refrigerant discharged from the first compressor 411 moves sequentially through the desuperheater heat exchanger 403, the heat source side heat exchanger 401, and the cascade heat exchanger 402 to perform both the floor heating operation and the indoor cooling operation. At this point, the usage side three-way valve 435 allows the usage side water discharged from the desuperheater heat exchanger 403 to be introduced into the floor heat exchanger 452. Also, the second refrigerant circulation part 42 is operated for the air-conditioning cooling operation. Thus, the floor may be dried, and simultaneously, the indoor cooling operation may be performed.

The hot water supply apparatus 4 associated with the heat pump in accordance with the embodiment shown in FIG. 8 may also include a refrigerant pipe 420, flow adjustment switch 425, an auxiliary heater 443 and water discharge passage 444 provided in the hot water supply device 44, a source water supply device 46 including a water supply passage 461, circulation passage 462, circulation side pump 463, circulation side supply passage 464, water supply adjustment device 465, circulation side discharge passage 466, water discharge adjustment device 467 and hot water supply side supply passage 468, and a hot water supply pipe 432 and heating/cooling water pipe 433. These components are similar to corresponding components discussed above with respect to previous embodiment(s), and thus further detailed description will be omitted.

Hereinafter, a hot water supply apparatus associated with a heat pump according to another embodiment will now be described with respect to FIG. 9. This embodiment is different from the embodiment shown in FIGS. 1 and 4 in that a desuperheater heat exchanger is connected to a second refrigerant circulation part and the amount of refrigerant introduced to the desuperheater heat exchanger and the amount of refrigerant bypassing the desuperheater heat exchanger may be varied. This embodiment may include elements similar to elements discussed above with respect to previous embodiment(s). Similar elements will be labeled with the same reference numerals and duplicative description thereof will be omitted wherever possible.

Figure 9:
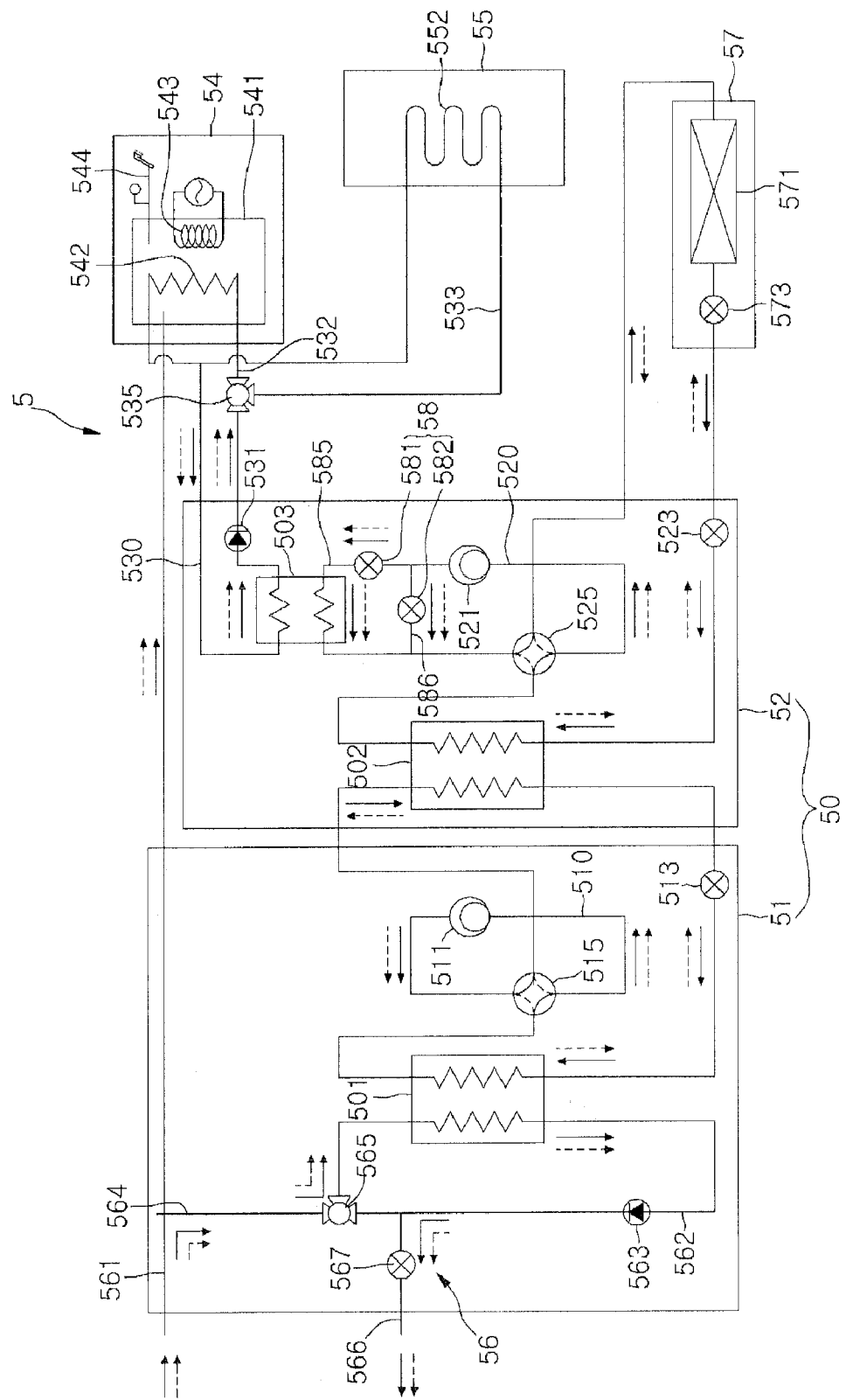
FIG. 9 is a schematic view of a hot water supply apparatus associated with a heat pump, according to another embodiment as broadly described herein.

Referring to FIG. 9, the hot water supply apparatus 5 may include a heat pump 50 having a first refrigerant circulation part 51, a second refrigerant circulation part 52, and a desuperheater heat exchanger 503 connected to the second refrigerant circulation part 52. The amount of refrigerant introduced into the desuperheater heat exchanger 503 and the amount of refrigerant bypassing the desuperheater heat exchanger 503 may be varied.

The second refrigerant circulation part 52 may include the desuperheater heat exchanger 503 in which usage side water is heat-exchanged with a second refrigerant discharged from a second compressor 521, a desuperheater pipe 585 guiding the second refrigerant at a discharge side of the second compressor 521 to the desuperheater heat exchanger 503, a bypass pipe 586 guiding the second refrigerant at the discharge side of the second compressor 521 to bypass the desuperheater heat exchanger 503, and a flow rate adjustment device 58 for adjusting the amount of refrigerant introduced into the desuperheater heat exchanger 503 and the amount of refrigerant bypassing the desuperheater heat exchanger 503. The flow rate adjustment device 58 may include a desuperheater flow rate adjustment device 581 installed on the desuperheater pipe 585 to adjust the amount of refrigerant introduced from the second compressor 521 to the desuperheater heat exchanger 503, and a bypass flow rate adjustment device 582 installed on the bypass pipe 586 to adjust the amount of refrigerant discharged from the second compressor 521 and bypassing the desuperheater heat exchanger 503.

The desuperheater heat exchanger 503 may be installed between the second compressor 521 and a second flow switch 525 on a second refrigerant cycle, to perform a hot water supply operation and a floor heating operation regardless of switching between air-conditioning heating and cooling modes. Thus, after passing through the desuperheater heat exchanger 503, the discharge side refrigerant of the second compressor 521 may selectively flow to one of an air-conditioning heat exchanger 571 provided, for example, in an indoor device 57 along with an expander 573, a cascade heat exchanger 502, based on a position of the second flow switch 525.

The amount of refrigerant introduced to the desuperheater heat exchanger 503 and the amount of refrigerant bypassing the desuperheater heat exchanger 503 may be adjusted based on a hot water supply load and/or a heating/cooling load. For example, when the hot water supply load is greater than the heating/cooling load, the amount of refrigerant introduced into the desuperheater heat exchanger 503 may be increased, and the amount of refrigerant bypassing the desuperheater heat exchanger 503 may be decreased. When the heating/cooling load is greater than the hot water supply load, the amount of refrigerant introduced into the desuperheater heat exchanger 503 may be decreased, and the amount of refrigerant bypassing the desuperheater heat exchanger 503 may be increased.

The hot water supply load may represent a difference between a water discharge temperature of a hot water supply device 54 and a target temperature thereof, and the heating/cooling load may represent a difference between a current temperature of an indoor space, which is a heating/cooling target of the air-conditioning heat exchanger 571, and a target temperature of the indoor space.

In this embodiment, regardless of whether the indoor space is being heated or cooled, the hot water supply operation may be continuously performed. In this embodiment, the hot water supply or floor heating operation and the air-conditioning heating/cooling operation may be simultaneously performed.

In this embodiment, an operation state of the hot water supply apparatus 5 may be optimized based on the hot water supply load and/or the heating/cooling load. In detail, when the hot water supply operation and the heating/cooling operation are simultaneously performed, the amount of hot water supply side refrigerant flowing through the desuperheater heat exchanger 503 and the amount of heating/cooling side refrigerant bypassing the desuperheater heat exchanger 503 and flowing directly into the air-conditioning heat exchanger 571 or the cascade heat exchanger 502 may be adjusted based on the hot water supply load and/or the heating/cooling load.

In particular, when the hot water supply load is greater than the heating/cooling load, the amount of refrigerant passing through the desuperheater heat exchanger 503 may be increased, that is, as the amount of heat transmitted to water in a hot water supply tank 541 of the hot water supply device 54 through a hot water supply heat exchanger 542 increases, a hot water supply target condition may be achieved more quickly. In addition, when the heating/cooling load is greater than the hot water supply load, the amount of refrigerant bypassing the desuperheater heat exchanger 503 may increase, and thus, the amount of refrigerant discharged from the second compressor 521 to the air-conditioning heat exchanger 571 may increase in the heating operation. Thus, the amount of heat transmitted to the indoor space through the air-conditioning heat exchanger 571 may increase, further improving heating performance. Thus, the operation state of the hot water supply apparatus 5 may be optimized based on the hot water supply load, that is, operation conditions.

The hot water supply apparatus 5 associated with the heat pump in accordance with the embodiment shown in FIG. 9 may also include a heat source side heat exchanger 501, refrigerant pipes 510/520, compressor 511, expansion devices 513/523, flow adjustment switch 515, an auxiliary heater 543 and water discharge passage 544 provided in the hot water supply device 54, a floor heating/cooling device 55 including a floor heat exchanger 552, a source water supply device 56 including a water supply passage 561, circulation passage 562, circulation side pump 563, circulation side supply passage 564, water supply adjustment device 565, circulation side discharge passage 566 and water discharge adjustment device 567, and a water pipe 530, usage side pump 531, hot water supply pipe 532, heating/cooling water pipe 533 and usage side three way valve 535. These components are similar to corresponding components discussed above with respect to previous embodiment(s), and thus further detailed description will be omitted.

Hereinafter, a hot water supply apparatus associated with a heat pump according to another embodiment will be described with respect to FIG. 10. This embodiment is different from the embodiment shown in FIG. 9 in that a desuperheater heat exchanger connected to a first refrigerant circulation part is also included. This embodiment may include elements similar to elements discussed above with respect to previous embodiment(s). Similar elements will be labeled with the same reference numerals and duplicative description thereof will be omitted wherever possible.

Figure 10:
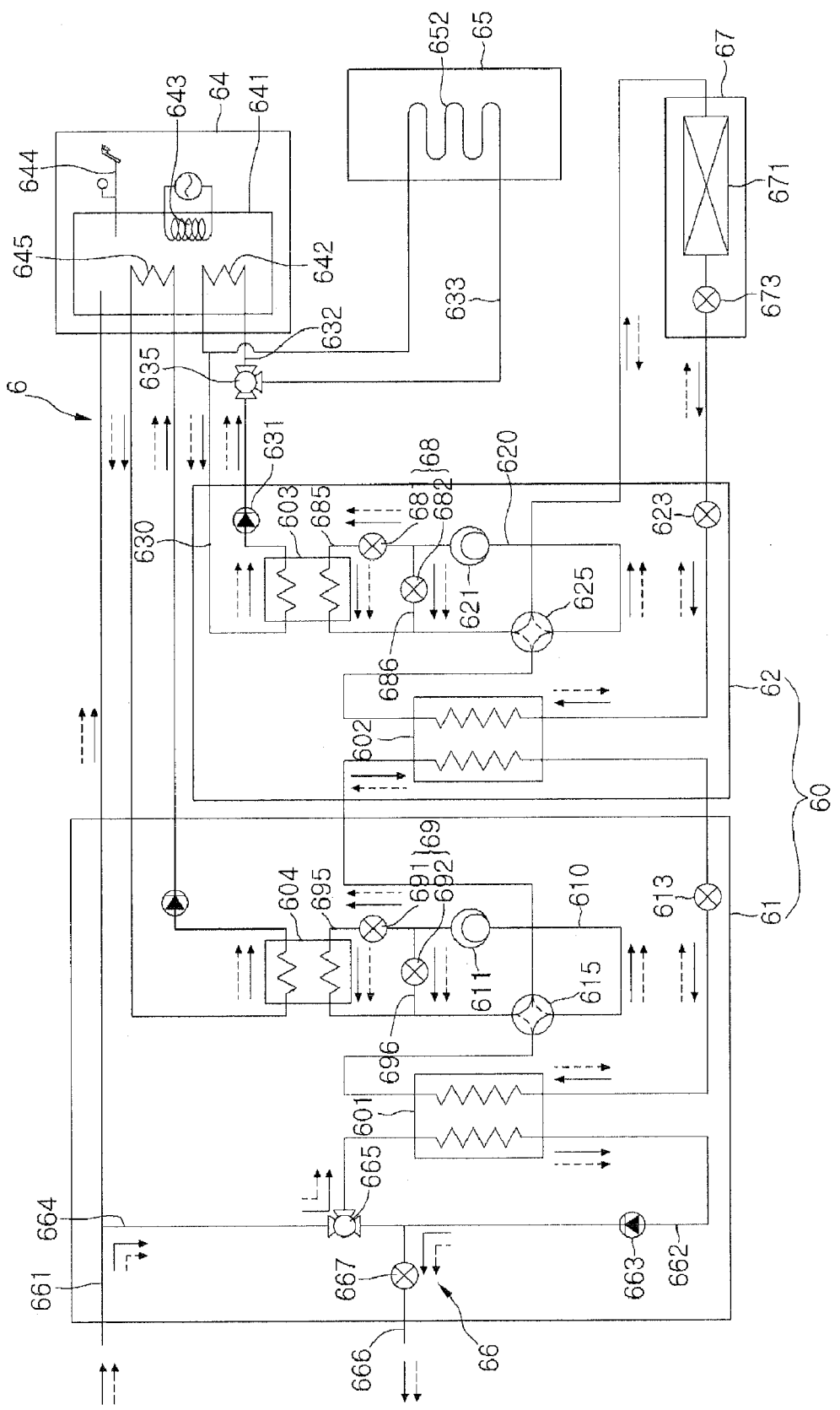
FIG. 10 is a schematic view of a hot water supply apparatus associated with a heat pump, according to another embodiment as broadly described herein.

Referring to FIG. 10, desuperheater heat exchangers 603 and 604 connected to the first and second refrigerant circulation parts 61 and 62 of a heat pump 60.

The first refrigerant circulation part 61 includes the first desuperheater heat exchanger 604 in which usage side water is heat-exchanged with a first refrigerant discharged from a first compressor 611, a desuperheater pipe 695 guiding the first refrigerant at a discharge side of the first compressor 611 to the first desuperheater heat exchanger 604, a first bypass pipe 696 guiding the first refrigerant at the discharge side of the first compressor 611 to bypass the first desuperheater heat exchanger 604, and a first flow rate adjustment device 69 for adjusting the amount of refrigerant introduced into the first desuperheater heat exchanger 604 and the amount of refrigerant bypassing the first desuperheater heat exchanger 604. The first flow rate adjustment device 69 includes a first desuperheater flow rate adjustment device 691 installed on the first desuperheater pipe 695 to adjust the amount of refrigerant introduced from the first compressor 611 into the first desuperheater heat exchanger 604, and a first bypass flow rate adjustment device 692 installed on the first bypass pipe 696 to adjust the amount of refrigerant discharged from the first compressor 611 and bypassing the first desuperheater heat exchanger 604.

A second refrigerant circulation part 62 may include the second desuperheater heat exchanger 603 in which usage side water is heat-exchanged with a second refrigerant discharged from a second compressor 621, a second desuperheater pipe 685 guiding the second refrigerant at a discharge side of the second compressor 621 into the second desuperheater heat exchanger 603, a second bypass pipe 686 guiding the second refrigerant at the discharge side of the second compressor 621 to bypass the second desuperheater heat exchanger 603, and a second flow rate adjustment device 68 for adjusting the amount of refrigerant introduced into the second desuperheater heat exchanger 603 and the amount of refrigerant bypassing the second desuperheater heat exchanger 603. The second flow rate adjustment device 68 includes a second desuperheater flow rate adjustment device 681 installed on the second desuperheater pipe 685 to adjust the amount of refrigerant introduced from the second compressor 621 into the second desuperheater heat exchanger 603, and a second bypass flow rate adjustment device 682 installed on the second bypass pipe 686 to adjust the amount of refrigerant discharged from the second compressor 621 and bypassing the second desuperheater heat exchanger 603.

The first desuperheater heat exchanger 604 is connected simultaneously to the first refrigerant circulation part 61 and a hot water supply device 64, and the second desuperheater heat exchanger 603 is connected simultaneously to the second refrigerant circulation device 62, the hot water supply device 64, and a floor heating device 65 including a floor heat exchanger 652.

In this embodiment, the hot water supply operation and the floor heating operation may be simultaneously performed. In more detail, the usage side water passing through the first desuperheater heat exchanger 604 flows to the hot water supply device 64, and simultaneously, the usage side water passing through the second desuperheater heat exchanger 603 flows to the floor heating device 65. A usage side three-way valve 635 may continually guide the water discharged from the second desuperheater heat exchanger 603 to the floor heating device 65. Thus, the hot water supply operation and the floor heating operation may be simultaneously performed. In addition, the respective amounts of refrigerants passing through and bypassing the first desuperheater heat exchanger 604 and the second desuperheater heat exchanger 603 may be varied.

In this embodiment, an operation state of the hot water supply apparatus 6 may be optimized based on the hot water supply load and/or the heating/cooling load. In the hot water supply operation and the heating/cooling operation, the amount of hot water supply side refrigerant flowing through the first and second desuperheater heat exchangers 604 and 603 and the amount of heating/cooling side refrigerant bypassing the first and second desuperheater heat exchangers 604 and 603 may be adjusted based on the hot water supply load and the heating/cooling load. For example, when the hot water supply load is greater than the heating/cooling load, the amount of refrigerant introduced into the first and second desuperheater heat exchangers 604 and 603 may be increased, and the amount of refrigerant bypassing the first and second desuperheater heat exchangers 604 and 603 may be decreased. When the heating/cooling load is greater than the hot water supply load, the amount of refrigerant introduced into the first and second desuperheater heat exchangers 604 and 603 may be decreased, and the amount of refrigerant bypassing the first and second desuperheater heat exchangers 604 and 603 may be increased.

The hot water supply load may be a difference between a current water discharge temperature of the hot water supply device 64 and a target temperature thereof, and the heating/cooling load may be a difference between a current temperature of an indoor space, which is a heating/cooling target of an air-conditioning heat exchanger 671 provided together with an expansion device 673 in an indoor device 67, and a target temperature of the indoor space.

The hot water supply apparatus 6 associated with the heat pump in accordance with the embodiment shown in FIG. 10 may also include first and second refrigerant pipes 610 and 620, expansion devices 613/623, flow adjustment switches 615/625, a storage tank 641, hot water supply heat exchangers 642 and 645, auxiliary heater 643 and water discharge passage 644 provided in the hot water supply device 64, a source water supply device 66 including a water supply passage 661, circulation passage 662, circulation side pump 663, circulation side supply passage 664, water supply adjustment device 665, circulation side discharge passage 666 and water discharge adjustment device 667, a heat source side heat exchanger 601, water pipe 630, usage side pump 631, hot water supply pipe 632 and heating/cooling water pipe 633. These components are similar to corresponding components discussed above with respect to previous embodiment(s), and thus further detailed description will be omitted.

Hereinafter, a hot water supply apparatus associated with a heat pump according to another embodiment will now be described with respect to FIG. 11. This embodiment is different from the embodiment shown in FIGS. 1 and 4 in that vapor refrigerants of refrigerants condensed in a refrigerant cycle may be injected into compressors. This embodiment may include elements similar to elements discussed above with respect to previous embodiment(s). Similar elements will be labeled with the same reference numerals and duplicative description thereof will be omitted wherever possible.

Figure 11:
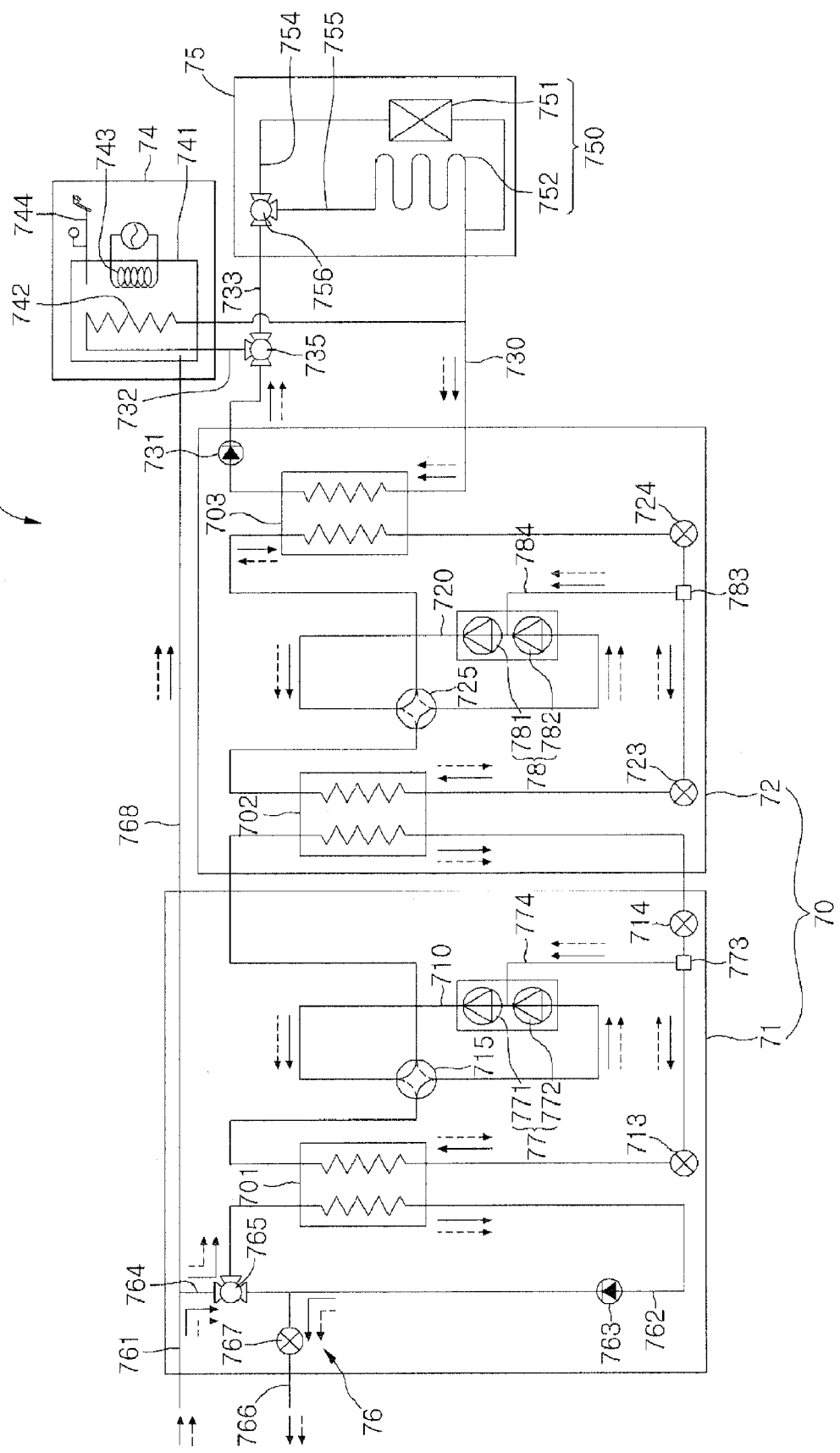
FIG. 11 is a schematic view of a hot water supply apparatus associated with a heat pump, according to another embodiment as broadly described herein.

The hot water supply apparatus 7 shown in FIG. 11 may include a heat pump 70 including first and second refrigerant circulation parts 71 and 72 in which vapor refrigerants of refrigerants condensed in a refrigerant cycle may be injected into compressors 77 and 78.

In detail, a first compressor 77 may be a multi-stage compressor that includes a first low stage compression part 772 for primary compression of a first refrigerant and a first middle compression part 771 for secondary compression of the first refrigerant compressed in the first low stage compression part 772. A second compressor 78 may be a multi-stage compressor that includes a second low stage compression part 782 for primary compression of a second refrigerant and a second middle compression part 781 for secondary compression of the second refrigerant compressed in the second low stage compression part 782.

A first phase divider 773 may divide the first refrigerant condensed in a cascade heat exchanger 702 or a heat source side heat exchanger 701 in a first refrigerant cycle into a vapor refrigerant and a liquid refrigerant. A first injection pipe 774 may inject the vapor refrigerant from the first phase divider 773 into the first middle compression part 771 of the first compressor 77. A second phase divider 783 may divide the second refrigerant condensed in the cascade heat exchanger 702 or a usage side heat exchanger 703 in a second refrigerant cycle into a vapor refrigerant and a liquid refrigerant. A second injection pipe 784 may inject vapor refrigerant from the second phase divider 783 into the second middle compression part 781 of the second compressor 78.

A first expander 713 and a second expander 714 may be provided at two opposite sides of the first phase divider 773 in the first refrigerant cycle, and a third expander 723 and a fourth expander 724 may be provided at two opposite sides of the second phase divider 783 in the second refrigerant cycle.

In a heating operation, the first refrigerant flowing between the cascade heat exchanger 702 and the heat source side heat exchanger 701 may be injected into the first compressor 77 in the first refrigerant circulation part 71 of the heat pump 70, and the second refrigerant flowing between the cascade heat exchanger 702 and the usage side heat exchanger 703 may be injected into the second compressor 78 in the second refrigerant circulation part 72 of the heat pump 70, thus increasing the amount of refrigerant flowing to the usage side heat exchanger 703 and further improving hot water supply and heating performance. In particular, although an evaporation heat amount of the first refrigerant may decrease in the heat source side heat exchanger 701 and degrade overall heating performance when the temperature of the heat source side water is relatively low, injection of the first and second refrigerants as described above counteract this effect to improve heating performance.

First and second injection valves selectively close first and second injection pipes 774 and 784 to selectively inject the first and second refrigerants into the first and second compressors 77 and 78 based on outside temperatures. For example, when a temperature of the heat source side water, that is, circulation water, is greater than or equal to a reference temperature, the first and second injection valves may be continually closed. When a temperature of the heat source side water is less than the reference temperature, the first and second injection valves may be continually opened.

The hot water supply apparatus 7 associated with the heat pump in accordance with the embodiment shown in FIG. 11 may also include first and second refrigerant pipes 710/720, first and second flow adjustment switches 715/725, a hot water supply device 74 including a storage tank 741, hot water supply heat exchanger 742, auxiliary heater 743 and water discharge passage 744, a heating/cooling device 75 including an indoor heat exchanger 750 having an air conditioning heat exchanger 751 and a floor heat exchanger 752, an air conditioning water pipe 754 and a floor water pipe 755 and a heating/cooling side three way valve 756, a source water supply device 76 including a water supply passage 761, circulation passage 762, circulation side pump 763, circulation side supply passage 764, water supply adjustment device 765, circulation side discharge passage 766, water discharge adjustment device 767 and hot water supply side supply passage 768, and a water pipe 730, usage side pump 731, hot water supply pipe 732, heating/cooling water pipe 733 and usage side three way valve 735. These components are similar to corresponding components discussed above with respect to previous embodiment(s), and thus further detailed description will be omitted.

Hereinafter, a hot water supply apparatus associated with a heat pump according to another embodiment will now be described with respect to FIG. 12. This embodiment is different from the embodiment shown in FIGS. 1 and 4 in that the hot water supply apparatus is configured as a multi-system apparatus including a plurality of hot water supply devices and a plurality of heating/cooling devices. This embodiment may include elements similar to elements discussed above with respect to previous embodiment(s). Similar elements will be labeled with the same reference numerals and duplicative description thereof will be omitted wherever possible.

Figure 12:
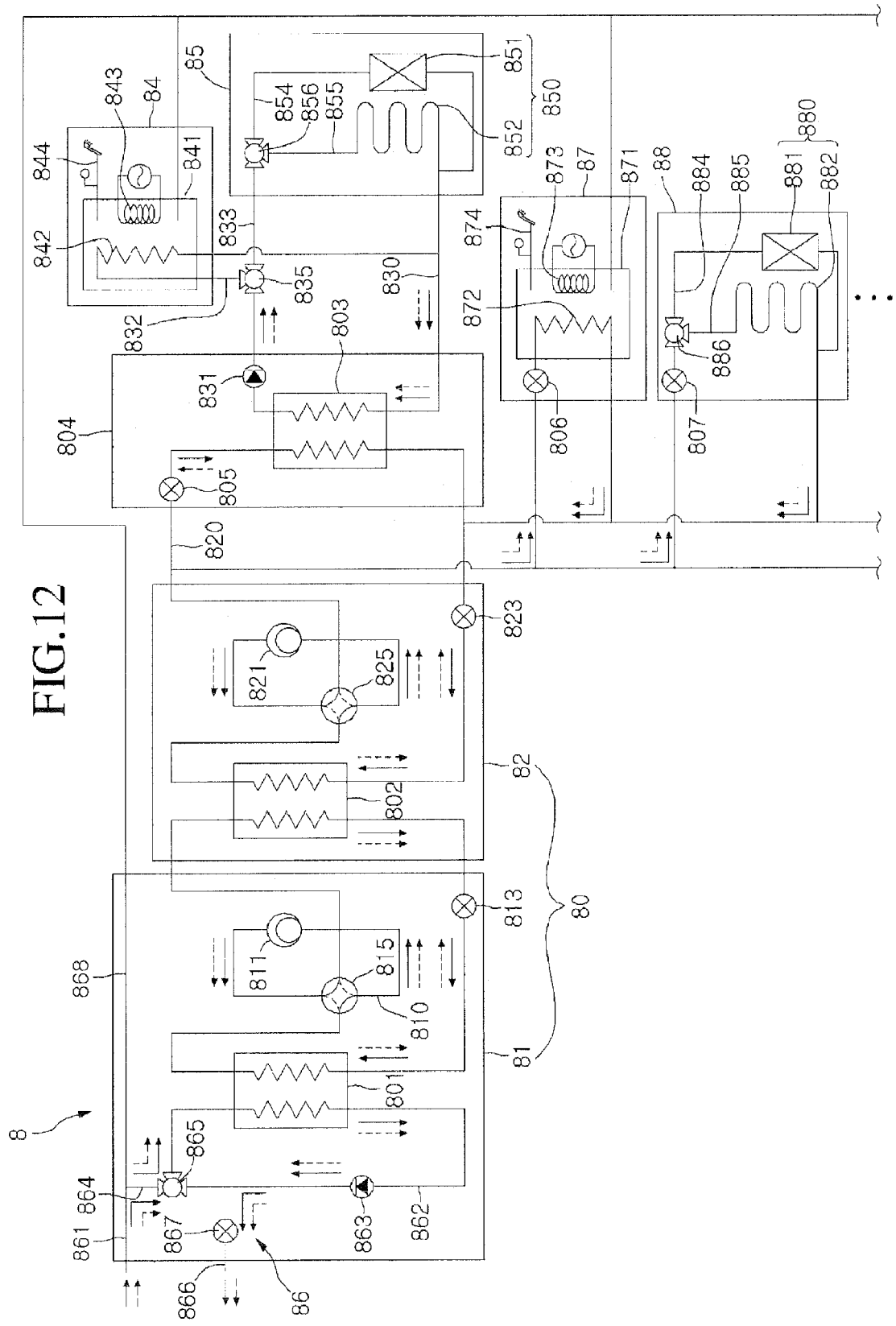
FIG. 12 is a schematic view of a hot water supply apparatus associated with a heat pump, according to another embodiment as broadly described herein.

Referring to FIG. 12, the hot water supply apparatus 8 configured as a multi-system apparatus may include a plurality of hot water supply devices 84 and 87 and a plurality of heating/cooling devices 85 and 88. That is, a single heat pump 80 having first and second refrigerant circulation parts 81 and 82 may perform a hot water supply operation of the hot water supply devices 84 and 87 and a heating/cooling operation of the heating/cooling devices 85 and 88. The heat pump 80 may employ a two-stage refrigerant cycle, that is, a cascade method.

In this hot water supply apparatus 8, the heat pump 80 performs heat exchange between heat source side water and the second refrigerant, and a relay 804 performs heat exchange between usage side water and the second refrigerant received from the heat pump 80. The first hot water supply device 84 uses water discharged from the relay 804 to perform a hot water supply operation, the first heating/cooling device 85 uses water discharged from the relay 804 to heat and cool an indoor space, the second hot water supply device 87 uses the second refrigerant discharged from the heat pump 80 to perform a hot water supply operation, and the second heating/cooling device 88 uses the second refrigerant discharged from the heat pump 80 to heat and cool the indoor space.

The heat pump 80 and the relay 804 may be connected to a second refrigerant pipe 820, and the first hot water supply device 84 and the first heating/cooling device 85 may be connected through a water pipe 830 to the relay 804. That is, the first hot water supply device 84 and the first heating/cooling device 85 may be indirectly connected to the heat pump 80 through the relay 804. The second hot water supply device 87 and the second heating/cooling device 88 may be directly connected to the heat pump 80 through the second refrigerant pipe 820. At this point, the relay 804, the second hot water supply device 87, and the second heating/cooling device 88 may be connected to the heat pump 80 in parallel. That is, the second refrigerant discharged from the heat pump 80 may be distributed to the relay 804, the second hot water supply device 87, and the second heating/cooling device 88.

The usage side water may be heat-exchanged with water of a hot water supply tank 841 in a hot water supply heat exchanger 842 of the first hot water supply device 84, and the second refrigerant may be heat-exchanged with water of a hot water supply tank 871 in a hot water supply heat exchanger 872 of the second hot water supply device 87.

Thus, the first hot water supply device 84 and the first heating/cooling device 85 indirectly receive, through the usage side water, heat from the second refrigerant heated by the heat source side water, and the second hot water supply device 87 and the second heating/cooling device 88 directly receive heat from the second refrigerant heated by the heat source side water.

A hot water supply side supply passage 832 may be connected to the hot water supply tank 841 of the first hot water supply device 84 and the hot water supply tank 872 of the second hot water supply device 87, so that water may be continually supplied to the hot water supply tanks 841 and 872 of the first and second hot water supply devices 84 and 87.

The second refrigerant pipe 820 connected to the relay 804, the second hot water supply device 87, and the second heating/cooling device 88 may be provided with flow rate adjustment devices 805, 806, and 807 corresponding respectively to the relay 804, the second hot water supply device 87, and the second heating/cooling device 88, so that the amount of refrigerant introduced into the relay 804, the second hot water supply device 87, and the second heating/cooling device 88 may be adjusted. The amount of refrigerant introduced into the relay 804, the second hot water supply device 87, and the second heating/cooling device 88 may be adjusted based on hot water supply loads and heating/cooling loads of the first hot water supply device 84, the first heating/cooling device 85, the second hot water supply device 87, and the second heating/cooling device 88.

In this embodiment, the single heat pump 80 may perform a hot water supply operation and a heating/cooling operation on a plurality of designated spaces. For example, the first hot water supply device 84 and the first heating/cooling device 85 may be installed at a first location, and the second hot water supply device 87 and the second heating/cooling device 88 may be installed at a second location, so that a hot water supply operation and a heating/cooling operation may be simultaneously or selectively performed at the first and second locations.

The hot water supply apparatus 8 associated with the heat pump in accordance with the embodiment shown in FIG. 12 may also include heat exchangers 801/802/803, first and second refrigerant pipes 810/820, first and second compressors 811/821, first and second expansion devices 813/823, first and second flow adjustment switches 815/825, auxiliary heaters 843/873 and water discharge passages 844/874 provided in hot water supply devices 84/87, indoor heat exchangers 850/880 having air conditioning heat exchangers 851/881 and floor heat exchangers 852/882, air conditioning water pipes 854/884, floor water pipes 855/885 and heating/cooling side three way valves 856/886 provided in heating/cooling devices 85/88, a source water supply device 86 including a water supply passage 861, circulation passage 862, circulation side pump 863, circulation side supply passage 864, water supply adjustment device 865, circulation side discharge passage 866, water discharge adjustment device 867 and hot water supply side supply passage 868, and a usage side pump 831, hot water supply pipe 332, heating/cooling water pipe 833 and usage side three way valve 835. These components are similar to corresponding components discussed above with respect to previous embodiment(s), and thus further detailed description will be omitted.

A hot water supply device associated with a heat pump is provided which may minimize degradation due to an outdoor condition variation and continuously perform a hot water supply operation and a heating operation without a defrosting operation.

A hot water supply device associated with a heat pump and using the heat pump to perform a hot water supply operation as embodied and broadly described herein may include a first refrigerant circulation part including a first compressor, a cascade heat exchanger in which heat exchanged between a first refrigerant and a second refrigerant, a first expander, a heat source side heat exchanger in which a first refrigerant absorbs or emit heat, so as to form a first refrigerant cycle, and a second refrigerant circulation part including a second compressor, a usage side heat exchanger using a second refrigerant to perform at least one of the hot water supply operation and a heating/cooling operation, a second expander, and the cascade heat exchanger, so as to form a second refrigerant cycle, wherein the refrigerants flowing through the heat source side heat exchanger and the usage side heat exchanger are heat-exchanged with water to continuously perform the hot water supply operation without a defrosting operation. Therefore, according to the present invention, degradation due to the variation in an outdoor condition such as outdoor temperature can be minimized and defrosting operation is unnecessary, and the hot water supply operation and the heating operation can be continuously performed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A hot water supply apparatus associated with a heat pump that performs a hot water supply operation, comprising:
    a first refrigerant circuit that circulates a first refrigerant, including a first compressor, a cascade heat exchanger in which heat is exchanged between the first refrigerant and a second refrigerant, a first expander, and a heat source side heat exchanger in which the first refrigerant absorbs or emits heat;
    a second refrigerant circuit that circulates the second refrigerant, including a second compressor, a usage side heat exchanger that performs at least one of the hot water supply operation or a heating/cooling operation using the second refrigerant, a second expander, and the cascade heat exchanger, wherein refrigerant flowing through the heat source side heat exchanger and the usage side heat exchanger are heat-exchanged with water so as to continuously perform the hot water supply operation without a defrosting operation; and
    a subcooler in which water passing through the heat source side heat exchanger undergoes heat-exchange with the first refrigerant or the second refrigerant, wherein the subcooler comprises a second subcooler in which water passing through the heat source side heat exchanger undergoes heat-exchange with the second refrigerant condensed in one of the usage side heat exchanger or the cascade heat exchanger, so as to subcool and condenser the second refrigerant.

2. The hot water supply apparatus of claim 1, wherein the subcooler comprises:
    a first subcooler in which water passing through the heat source side heat exchanger undergoes heat-exchange with the first refrigerant condensed in one of the cascade heat exchanger or the heat source side heat exchanger, so as to subcool and condense the first refrigerant.

3. The hot water supply apparatus of claim 2, wherein the first subcooler is installed between the cascade heat exchanger and the first expander on the first refrigerant circuit.

4. The hot water supply apparatus of claim 1, wherein the second subcooler is installed between a usage side heat exchanger and a second expander on a second refrigerant circuit.

5. The hot water supply apparatus of claim 1, further comprising:
    a hot water supply device that performs the hot water supply operation using at least one of the first refrigerant or the second refrigerant;
    a circulation passage that circulates water flowing through the heat source side heat exchanger;
    a hot water supply side supply passage that guides water from a water supply source to the hot water supply device; and
    a circulation side supply passage connected to the circulation passage so as to ba guide water from the water supply source to the heat source side heat exchanger.

6. The hot water supply apparatus of claim 5, wherein the first and the second subcooler are installed at points corresponding to a discharge side of a heat source side heat exchanger on the circulation passage.

7. The hot water supply apparatus of claim 1, wherein the first and the second subcooler comprise a water-refrigerant heat exchanger accommodating a water passage and a refrigerant passage that are adjacent to each other to exchange heat between water and refrigerant.

8. The hot water supply apparatus of claim 1, further comprising:
    a first cooling expander installed between the first subcooler and the cascade heat exchanger; and
    a second cooling expander installed between the second subcooler and the usage side heat exchanger.

9. The hot water supply apparatus of claim 8, wherein the first expander and the second expander are completely opened, and refrigerants pass through the first and second subcoolers are expanded in the first and second cooling expanders such that the refrigerant condensed through the heat source side heat exchanger emits heat to the heat source side water in the subcoolers and is subcooled when the cooling operation is performed.

* * * * *